US011103395B2

(12) United States Patent
Hetzel et al.

(10) Patent No.: US 11,103,395 B2
(45) Date of Patent: Aug. 31, 2021

(54) TECHNIQUES FOR SHAPE CAPTURE AND WHEEL CHAIR SEAT CREATION

(71) Applicant: ASPEN SEATING, LLC, Littleton, CO (US)

(72) Inventors: Thomas R. Hetzel, Littleton, CO (US); Joseph S. Bieganek, Littleton, CO (US); Joshua A. Middel, Littleton, CO (US); Steve Maurus, Littleton, CO (US); Edward J. Gillman, Denver, CO (US)

(73) Assignee: Aspen Seating, LLC, Littleton, CO (US)

( * ) Notice: Subject to any disclaimer, the term of this patent is extended or adjusted under 35 U.S.C. 154(b) by 492 days.

(21) Appl. No.: 15/873,752

(22) Filed: Jan. 17, 2018

(65) Prior Publication Data

US 2018/0200129 A1    Jul. 19, 2018

Related U.S. Application Data

(60) Provisional application No. 62/447,736, filed on Jan. 18, 2017.

(51) Int. Cl.
*A61G 5/10*    (2006.01)
*A61G 13/12*    (2006.01)
*B29C 33/38*    (2006.01)

(52) U.S. Cl.
CPC .......... *A61G 5/1091* (2016.11); *A61G 5/1045* (2016.11); *A61G 5/1048* (2016.11);
(Continued)

(58) Field of Classification Search
CPC .............. A61G 5/1091; A61G 13/1275; A61G 5/1048; A61G 5/1045; A61G 2200/20; B29C 33/3857
See application file for complete search history.

(56) References Cited

U.S. PATENT DOCUMENTS 4,972,351 A * 11/1990 Reger .................. A47C 31/126
264/222
2006/0227336 A1    10/2006 Dinner et al.

FOREIGN PATENT DOCUMENTS

WO    91/11142 A1    8/1991

OTHER PUBLICATIONS

Canadian Office Action, for Application No. 2,992,200, dated Feb. 26, 2019.

* cited by examiner

*Primary Examiner* — Robert J Grun
(74) *Attorney, Agent, or Firm* — Snell & Wilmer L.L.P.

(57) ABSTRACT

A technique for capturing a three-dimensional digital image of a customized shape for a wheelchair seat and back and subsequently producing a seat and back from the image. The captured image may include one or more datum points therein to provide a reference plane for the seat and back. The datum points may be in a color-coded layer located relative to the bottom edge of the seat. The color code may indicate the size of the user and seat at a coarse level. The customized shape may be captured from a shape capture bag or bags that capture one or both of the shape of the user's back and bottom. The shape capture bag used to capture the shape of the user's bottom, for use in manufacturing the seat, may be enhanced by a pre-formed layer that contains a contour or one or more components that together form a contour that biases the shape capture bag toward the shape of the user's bottom when gravity is acting upon the user to sink into a cushioned seat.

30 Claims, 28 Drawing Sheets

(52) U.S. Cl.
CPC ...... *A61G 13/1275* (2013.01); *A61G 2200/20* (2013.01); *B29C 33/3857* (2013.01)

60

TECHNIQUES FOR SHAPE CAPTURE AND WHEEL CHAIR SEAT CREATION

CROSS-REFERENCE TO RELATED APPLICATIONS

This application claims priority to U.S. Provisional Application No. 62/447,736, filed Jan. 18, 2017, the contents of which are incorporated herein by reference in its entirety.

BACKGROUND

Seating for wheelchairs has evolved from flat cushions to generally-contoured cushions to custom-contoured cushions. However, the measurement of the custom contours needed for a particular wheelchair user and the manufacture of the wheelchair seat in accordance with the custom contours has been challenging.

The current state of the art is to have the user sit in a foam mold in order to make a foam impression of the user's buttocks and thighs. The back shape is captured with a vacuum-enabled capture bag assembly which includes an outer bag that can hold a vacuum and has a port therein to be attached to a vacuum pump via a hose that includes a control valve. Inside the outer bag is an inner bag through which air can easily pass, the inner bag being filled with pellets made of any appropriate kind of foam pellets, such as Styrofoam, expanded polystyrene (EPS), expanded Polypropylene (EPP), or other. The wheelchair user is placed onto the foam mold and against the capture bag in a desired position. The control valve for the capture bag is actuated to pull a vacuum on the bag sufficient to retain the shape of the back of the user. The user's hips and thighs are pushed downward to make the desired impression in the foam mold. The user is then removed from the mold and capture bag and a layer of plaster is applied to the capture bag to create a plaster impression. The foam impression for the seat and the plaster impression for the back are then shipped to a manufacturing facility and the custom seat and back are created therefrom. If desired, skilled personnel may adjust the precise shape of the seat and/or back to relieve supportive loading surface areas at or near the bony prominences of the individual.

It is against this background that the techniques described herein have been developed.

SUMMARY

Disclosed herein is a method for creating a wheelchair seat. The method includes providing a wheelchair; providing one or more components that together define an upper non-planar surface that is generally in the shape of a contoured seat for a human subject and a lower surface that has a fixed angular orientation relative to the wheelchair; placing onto the non-planar surface a shape capturing device; seating a human subject on the shape capture device; capturing the shape of a portion of the human subject with the device while the human subject is seated on the device; once the human subject is removed from the device, using a three-dimensional scanner to create a captured three-dimensional digital image of surface portions of the device that were impacted by the human subject sitting on the device; providing a seat-forming machine; providing to the seat-forming machine a digital file that is based on the captured three-dimensional digital image; and forming material associated with the seat-forming machine to create a seat layer for the human subject based on the digital file.

The one or more components may include a set of datum points thereon, wherein the captured three-dimensional image includes at least three of the set of datum points, wherein the at least three datum points define a plane that is parallel to the lower surface of the one or more components, and wherein the digital file includes data therein to communicate to the seat-forming machine an angular offset between the plane and an upper surface of the seat layer to be formed.

The one or more components may include a single layer of material that is in the shape of a contoured seat for a human subject. The one or more datum points may lie on the single layer of material. The one or more datum points may lie on a second layer of material that is located adjacent to a bottom surface of the single layer of material. The second layer may include at least one visible indication thereon that indicates the size of the contoured seat. The visible indication may include a color code. The single layer may include at least one visible indication thereon that indicates the size of the contoured seat. The visible indication may include a color code. The layer of material in the shape of the contoured seat may be a layer of foam material, the foam material being of a first hardness, and wherein the seat layer may be a layer of foam material that is of a second hardness that is softer than the first hardness layer. The seat layer may be combined with the contoured seat layer to rest on top thereof. The seat layer may be combined with a separate instance of a contoured seat layer to rest on top thereof. The seat layer may be formed of a unitary piece of material with a lower surface having the same fixed angular orientation relative to the wheelchair.

The captured three-dimensional digital image may be adjusted to off-load certain areas of the human subject, and the adjustments to the three-dimensional digital image are represented in an adjusted three-dimensional digital image which is then converted to the digital file for the seat-forming machine.

The seat-forming machine may use an additive process to form the seat layer. The additive process may include a 3-D printer. The seat-forming machine may use a subtractive process to form the seat layer. The subtractive process may include a CNC machine.

The shape-capturing device may include a pellet-filled bag and a port in the device for fluid communication between an interior of the device and an exterior of the device and the device also includes a pump for selectively evacuating air from the device. The device may include an outer, sealable bag having the port therein, and wherein the pellet-filled bag may be located within the outer bag. The outer bag may be replaced before the method is performed for each new human subject. At least a portion of the contoured seat may be positioned inside of the outer bag. Trim lines may be drawn directly onto the outer bag by an operator. At least a portion of the contoured seat may be positioned inside of the pellet-filled bag.

The shape capture device may capture a shape of at least portions of the back of the human subject, and wherein the captured three-dimensional digital image includes surface portions of the captured back shape; the digital file may be based at least in part on the surface portions of the captured back shape; and the forming material step may include creating a wheelchair seat back for the human subject based on the digital file. The one or more components may include a set of datum points thereon, wherein the captured three-dimensional image includes at least three of the set of datum points, wherein the at least three datum points define a plane that is parallel to the lower surface of the one or more components, and wherein the digital file includes data therein to communicate to the seat-forming machine an angular offset between the plane and an wheelchair seat back to be formed. The one or more components may include a set of datum points thereon, wherein the captured three-dimensional image includes at least three of the set of datum points, wherein the at least three datum points define a plane that is parallel to the lower surface of the one or more components, and wherein the digital file includes data therein to communicate to the seat-forming machine an angular offset between the plane and an upper surface of the seat layer to be formed; wherein the captured three-dimensional image maintains a relationship between the wheelchair seat back and the upper surface of the seat layer by reference to the datum points.

The seat layer may be combined with a contoured seat that includes a plurality of components, wherein the seat layer is located on top of the contoured seat. The contoured seat with a plurality of components may include a fluid bladder therewithin. The fluid bladder may be adjustable to change the amount of fluid therein.

Also disclosed is a method for creating a wheelchair back. The method includes providing a wheelchair; providing a set of datum points relative to the wheelchair; placing onto the wheelchair a shape capturing device; seating a human subject on the wheelchair and placing a back of the human subject against the shape capture device; capturing the shape of a portion of the back of the human subject with the device while the human subject is seated on the device; once the human subject is removed from the device, using a three-dimensional scanner to create a captured three-dimensional digital image of surface portions of the device that were impacted by the back of the human subject; providing a back-forming machine; providing to the back-forming machine a digital file that is based on the captured three-dimensional digital image and includes the angular orientation of the surface portions of the device relative to the datum points; and forming material associated with the back-forming machine to create a wheelchair back for the human subject based on the digital file.

The captured three-dimensional digital image may be adjusted to off-load certain areas of the human subject, and the adjustments to the three-dimensional digital image are represented in an adjusted three-dimensional digital image which is then converted to the digital file for the back-forming machine.

The back-forming machine may use an additive process to form the wheelchair back. The additive process may include a 3-D printer. The back-forming machine may use a subtractive process to form the wheelchair back. The subtractive process may include a CNC machine. The shape-capturing device may include a pellet-filled bag and a port in the device for fluid communication between an interior of the device and an exterior of the device and the device also includes a pump for selectively evacuating air from the device. The device may include an outer, sealable bag having the port therein, and wherein the pellet-filled bag is located within the outer bag. The outer bag may be replaced before the method is performed for each new human subject. At least a portion of a contoured seat back base may be positioned inside of the outer bag. Trim lines may be drawn directly onto the outer bag by an operator. At least a portion of a contoured seat back base may be positioned inside of the pellet-filled bag.

The wheelchair back may be composed of a back layer combined with a contoured seat back base, wherein the contoured seat back base includes a plurality of components. The contoured seat back base with a plurality of components may include a fluid bladder therewithin. The fluid bladder may be adjustable to change the amount of fluid therein.

Any of the steps, features, or alternatives mentioned herein could be combined in any combination with any of the methods described herein.

DETAILED DESCRIPTION

Figure 1:
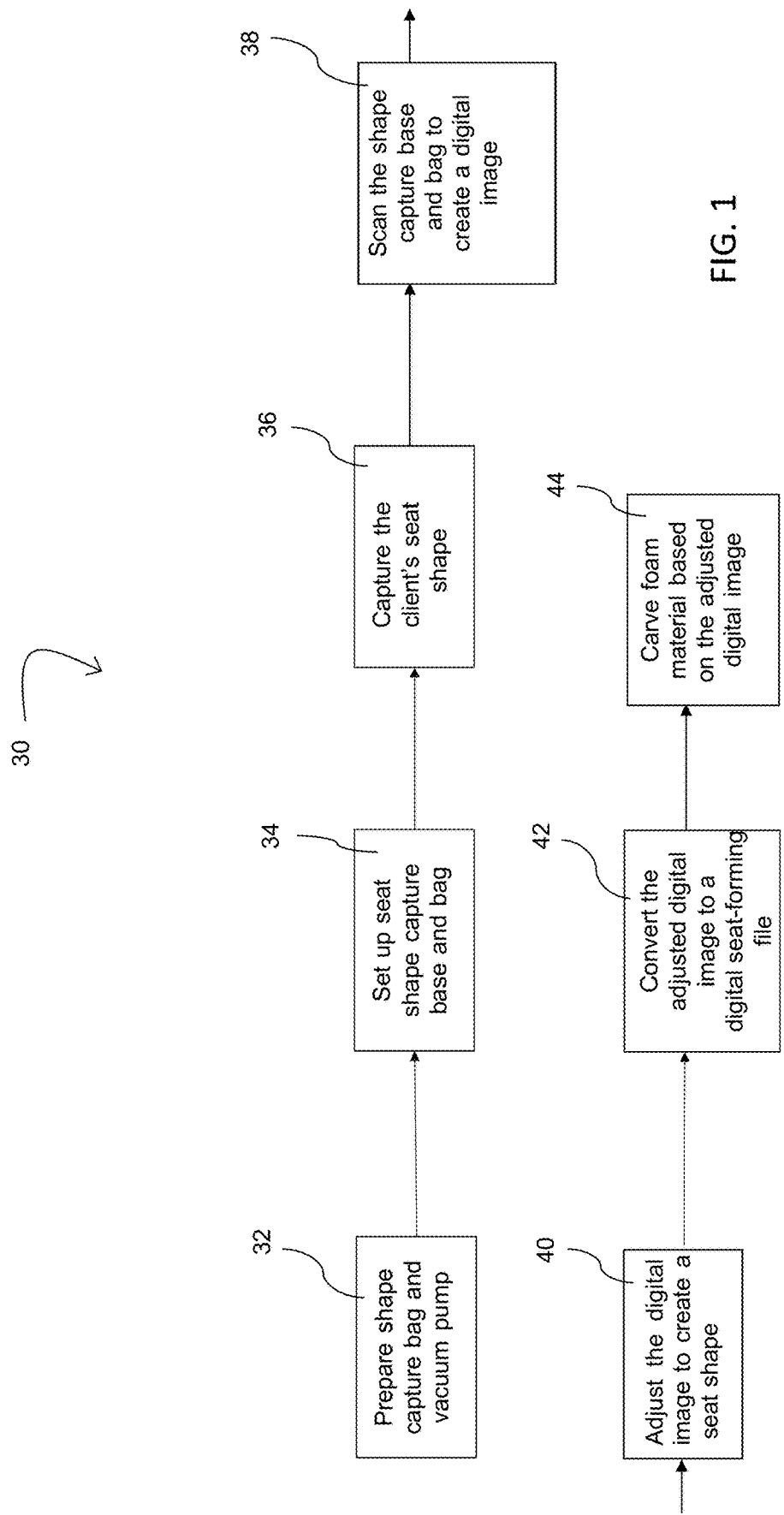
FIG. 1 is a high-level flowchart of the techniques disclosed herein.

While the embodiments disclosed herein are susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives of embodiments of the invention as defined by the claims. The disclosure is described with reference to the drawings, wherein like reference numbers denote substantially similar elements.

The disclosure herein generally relates to capturing a desired shape for one or both of a seat and a back of a wheelchair with a mechanism such as a shape capture bag, then capturing a three-dimensional digital image of the desired shape, then adjusting the shape to relieve high pressure areas by off-loading (and create additional loading on certain other portions) of the user's body, then converting the adjusted shape to a digital file suitable for a seat-forming machine, and then forming the seat and/or back. The shape capture with the shape capture bag may be enhanced with a lower preformed layer with a specifically-contoured shape that the shape capture bag is supported by. The preformed layer may have datum points therein that are captured in the digital image, or the datum points may be supplied by a datum layer associated with the preformed layer. Further, the datum layer may be color-coded or have other indications thereon that indicate the size of the datum layer. The datum layer may also provide additional depth to the preformed layer, for circumstances where it is needed.

FIG. 1 shows a general flow chart of the process 30. Step 32 shows the preparation and of the shape capture bag and pump. A new, clear, disposable plastic bag (e.g., 28"×50") may be installed over the seat shape capture bag for every new user or client. With the plastic bag placed over the cloth bag, the bag is lifted off the ground by the attached hose and the clear plastic bag material is evenly gathered around the foam tubing. The bag is verified to not be twisted inside the clear plastic bag. Next, the clear plastic bag is secured/sealed to the foam tubing on the hose using a removable zip tie. The vacuum pump is attached to the seat shape capture bag hose assembly via a quick disconnect. A slide valve is provided to control the flow of air to or from the shape capture bag.

Step 34 shows the set-up of the seat capture base and bag. An appropriately-sized seat shape capture base (large, medium or small) is placed onto the seat rails or other support mechanism on the frame of the shape capture wheelchair/simulator. The slide valve is adjusted for the seat capture bag to the ("bag soft") position to allow air to freely flow into or out of the bag. The slide valve is then slowly adjusted so that the bag generally holds its shape, but remains malleable. The bag is then pre-shaped for the user, adjusting the pellets/beads volume by pushing excess pellets/beads and bag behind the capture base or off to either side and out of the way. The slide valve is then positioned to the ("bag hard") position where air is pumped out of the bag.

Step 36 shows the capture of the user's seat shape. The user is positioned onto the seat shape capture bag with the user's hips fully back in the shape capture base. The slide valve is adjusted to the ("bag soft") position to allow air to freely flow into or out of the bag. The user's pelvis is rocked from side to side to immerse the client into the pellets/beads and allowing free flowing beads to move under and fill the space between anatomy and shape capture bag/base, being careful not to bottom-out the user on the shape capture base. The wheelchair/simulator foot rest is adjusted/shimmed to obtain the desired leg position. The slide valve is adjusted towards the "bag hard" position until the shape capture bag holds its shape, but remains malleable. The bag is formed around the client to capture the cantle, trochanter, leg lateral and medial areas. The front corners of the colored foam on the shape capture base should not be covered by the shape capture bag, as this information is needed during the seat shape modification process. Once satisfied with the user's position, the slide valve is adjusted to the "bag hard" position and is maintained in this position until all scans and photos are taken. With the user still on the shape capture bag, the location of the right and left trochanters may be marked with a permanent marker directly onto the clear outer bag. The user is then removed from the seat capture bag.

Step 38 shows the scan and image creation step 38. The RideWorks app on an iPad or other tablet is opened. In the RideWorks app, the SCAN icon is selected to open the scanner. Trim lines may be hand-drawn directly onto the clear outer bag. The operator stands approximately three feet away from the shape to be scanned. On the iPad screen, the cube is sized, using a two-finger pinch motion so the entire shape fits within the cube boundary. The SCAN button is selected to begin scanning. As soon as scanning begins, a 3D model will appear in white on top of the shape in real time. Once scanning has begun, the operator moves slowly in a circular path around the shape. If holes in the model are noticed, the operator goes back to that area of the shape and the scanner will fill them in. Once satisfied with the model, the STOP icon is selected to finish scanning. The app processes the scan and adds color to the model. When the app finishes processing, the 3D image of the model can be spun around by the operator using the touch screen, to make sure all the trim lines are visible. To start over, the operator can select "Rescan." To accept and save the scan, the operator can select "Save." The scan will appear in the client bin in the list of files ready for submission to the cushion manufacturer.

Step 40 shows the adjustment of the digital image to create a seat shape that is modified from that of the digital image so as to relieve pressure from high risk areas of the user's body and to add load to low risk areas of the user's body. Techniques for such adjustment of a contoured seat cushion are more fully disclosed in U.S. Pat. No. 7,216,388, the entire contents of which are incorporated herein by reference. Various software tools may be used in implementing these techniques.

Step 42 shows the conversion of the adjusted digital image to a digital seat-forming file. The type of digital seat-forming file that will be created will depend on the type of seat-forming machine that is being used, which in general could include any machine that creates shapes from any additive or subtractive process. For example, it could be a print file, or it could be a file of portions to remove from a workpiece, such as a block of foam or other material.

Step 44 shows the creation of the seat based on the digital seat-forming file. As mentioned, this seat forming step 44 could be performed with any type of additive or subtractive process. This could include a 3-D printer, a CNC machine that cuts/mills/routes/carves/other, or any other suitable process. As merely an example, throughout this description, a CNC router machine such as Model No. D5E from Diversified Machine Systems or such as Model No. D3 from Diversified Machine Systems will be used.

Figure 2:
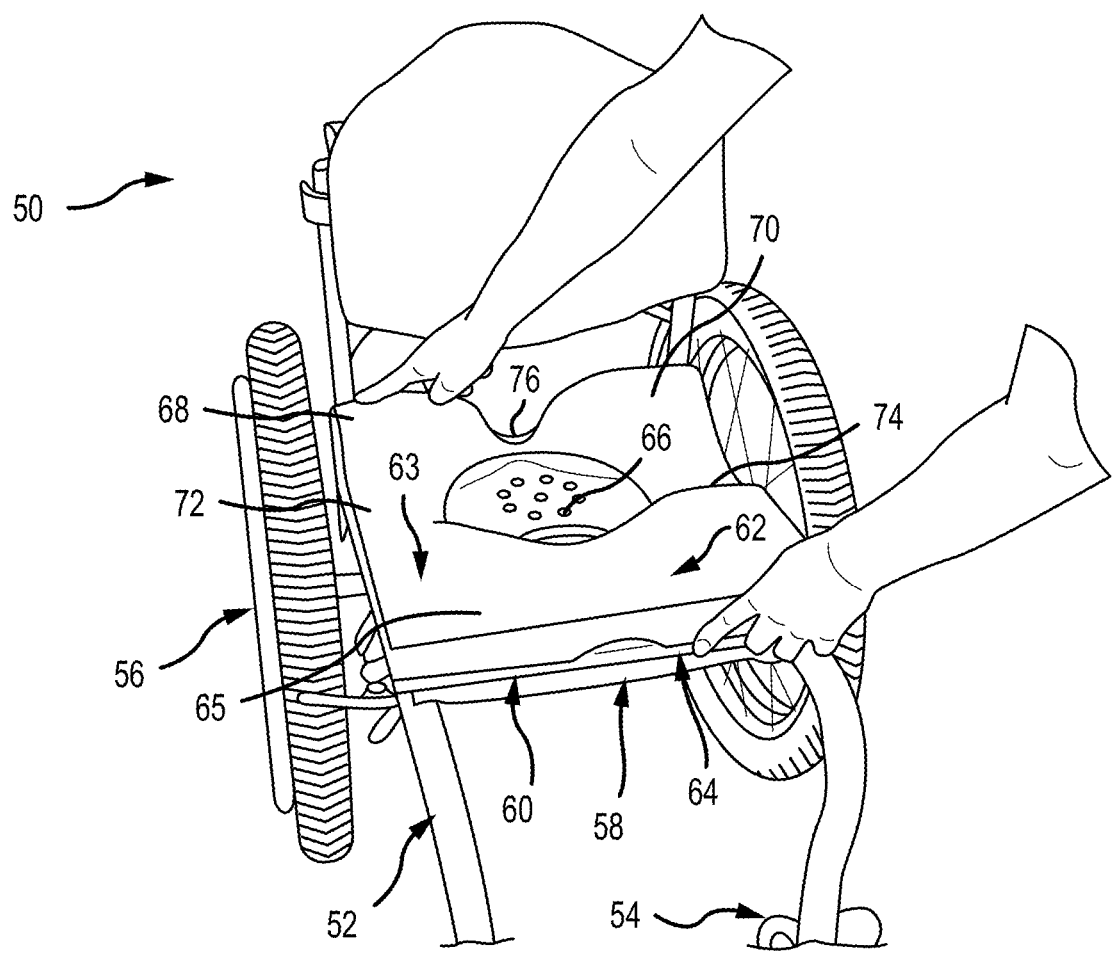
FIG. 2 is an image of a datum layer and a hard foam seat layer on a support base of a wheelchair.

FIG. 2 shows a wheelchair 50, with a frame including a pair of seat rails 52. The seat rails 52 transition into vertical rails that have caster wheels 54 at ends thereof. The frame is supported by a pair of rear drive wheels 56. On top of the seat rails 52, a support base 58 is provided on top of which a red datum layer 60 has been placed, and on top of the datum layer 60, a seat shape capture base 62 has been placed. The seat shape capture base 62 can be seen to be highly contoured (non-planar) on its upper surface 63, with a generally-planar forward-half region 65, a central region 66 that is at a significantly lower height than the forward-half region 65, a pair of rear-corner regions 68 and 70 that have a significantly higher height than the forward-half region 65, and depressed transitional areas 72, 74, and 76 between these various regions. These various lowered regions are intended in part to reduce loading of high risk areas of the user's bottom and the various raised regions are intended in part to increase the loading or support to low risk areas of the user's bottom.

The seat shape capture base 62 also has a (in this case planar) bottom surface 64. The seat shape capture base 62 could be composed of any suitable material, one example of which is expanded polyethylene foam. Other non-limiting examples of material that could be used for the seat shape capture base 62 are polyurethane, polypropylene, or any material with firmness properties rigid enough to maintain the pre-contoured shape under the weight of a typical wheelchair user. While an integral seat shape capture base 62 has been described herein, the same effect could be obtained by combining one or more objects (e.g., wedges, lifts, etc.) together to form a contoured upper surface. So any means that creates an upper contoured surface to bias a seat shape capture bag could be used.

As has been previously mentioned, the datum layer 60 provides several useful functions. First, by increasing the effective thickness of the seat shape capture base 62, the range of depths for the user's seat shape is increased by the thickness of the datum layer 60. Second, each datum layer 60 can be color-coded, with one color (e.g. such as red) signifying a large size, a second color (e.g., such as white) signifying a small size, and a third color (e.g., such as green) signifying a medium size. Third, by making the datum layer 60 visually distinctive relative to the seat shape capture base 62, the three-dimensional digital image captured by the scanner will clearly show the upper edges of the datum layer 60, the bottom edges of the datum layer 60, and the corners thereof, any of which serve as datum points. In preparing the digital file for the seat forming machine to use in preparing the custom seat layer, the datum layer provides a known reference for all points on the custom shape to be produced. In other words, the contours produced in the custom seat layer can be created relative to the bottom surface of the custom seat which will rest on and be supported by the seat rails 52 on the wheelchair 50, and be in the same position as the visible datum layer 60.

It should also be noted that the custom seat produced could be a single integral unit or it could be a combination of layers, such as a seat shape capture base 62 with a custom seat layer added thereon. In such case, the seat shape capture base 62 may be composed of a relatively-harder foam or material onto which the custom seat layer composed of a relatively-softer foam may be placed.

Figure 3:
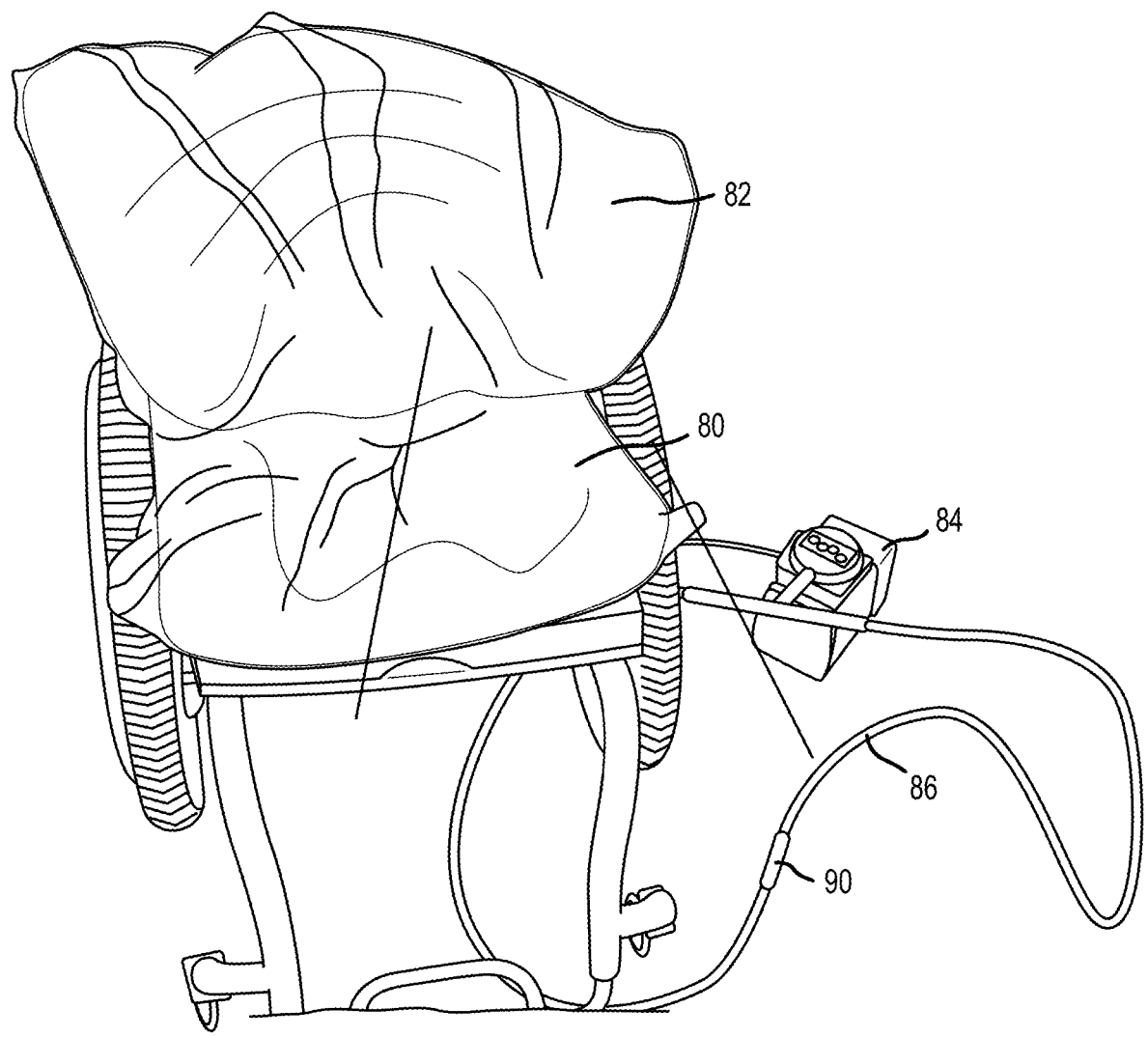
FIG. 3 is an image of a pair of shape capture bags that have been placed on the hard foam seat layer on the wheelchair.
Figure 4:
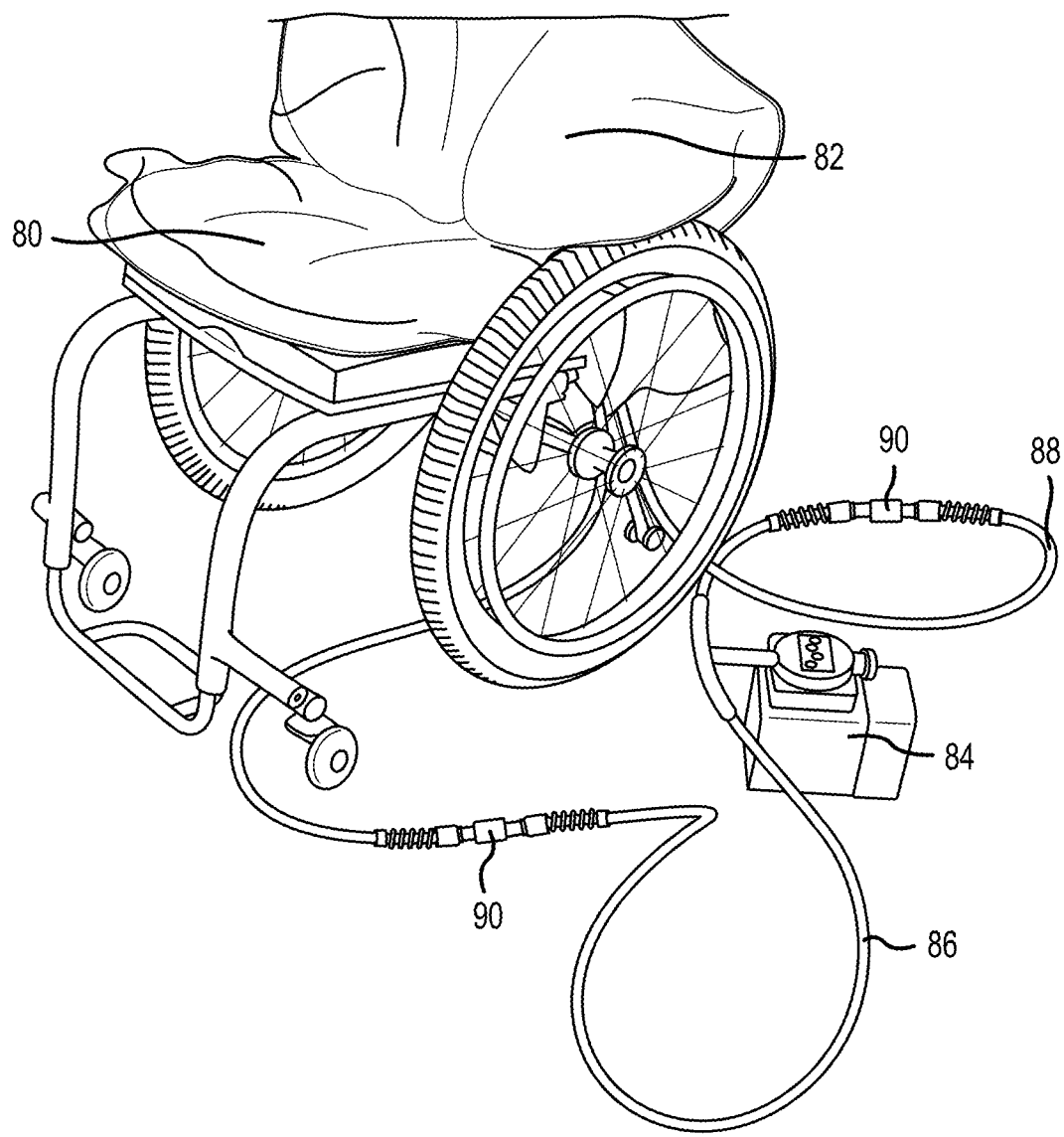
FIG. 4 is an image taken from a different angle than FIG. 3.

FIGS. 3 and 4 show the arrangement of a pair of shape capture bags 80 and 82 resting on the frame of the wheelchair 50. In particular, one shape capture bag 80 is resting on the seat shape capture base 62 and one shape capture bag 82 is positioned vertically so as to capture the back shape of the user. Also shown is a vacuum pump 84 and a pair of hoses 86 and 88 that lead to the shape capture bags 80 and 82 on the seat shape capture base 62 and the seat back. As can be seen, slide valves 90 are included as part of the hoses. As has been described above, the slide valves 90 can be selectively actuated between a first position that places the pump 84 in fluid communication with the interior of the shape capture bag 80 or 82 (which draws air out of the bag and eventually causes the pellets in the bag to compress against each other, hardening the bag) and a second position that places the interior of the shape capture bag in fluid communication with the environment. In this second position, it can be appreciated that the bag will reach a state where ambient air pressure exists inside the bag (so that the pellets in the bag are not compressed against each other and the bag is soft and malleable). It should be noted that the pellets in the shape capture bag could refer to any standard type of pellet, such as any suitable type of foam or other pellets, such as Styrofoam, expanded polystyrene (EPS), expanded Polypropylene (EPP), or other. Further, pellets could refer to any sort of smooth or irregularly-shaped objects that can move relative to each other when not compressed together, yet form a relatively-stiff material when compressed together.

Figure 5:
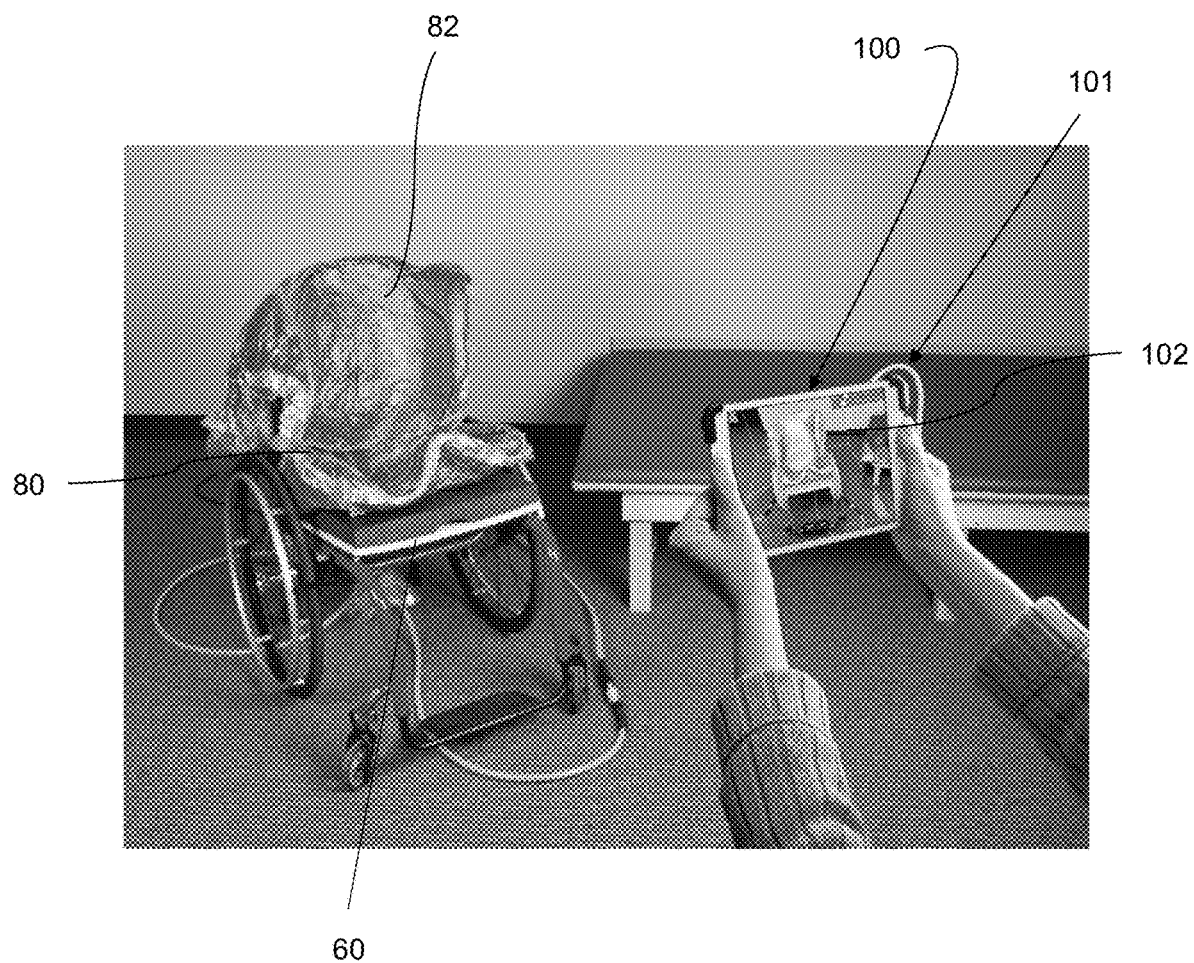
FIG. 5 is an image of an operator using an electronic tablet to capture a three-dimensional digital image of the shape capture bags on the wheelchair, after the bags have captured the shape of the user's back and bottom.
Figure 6:
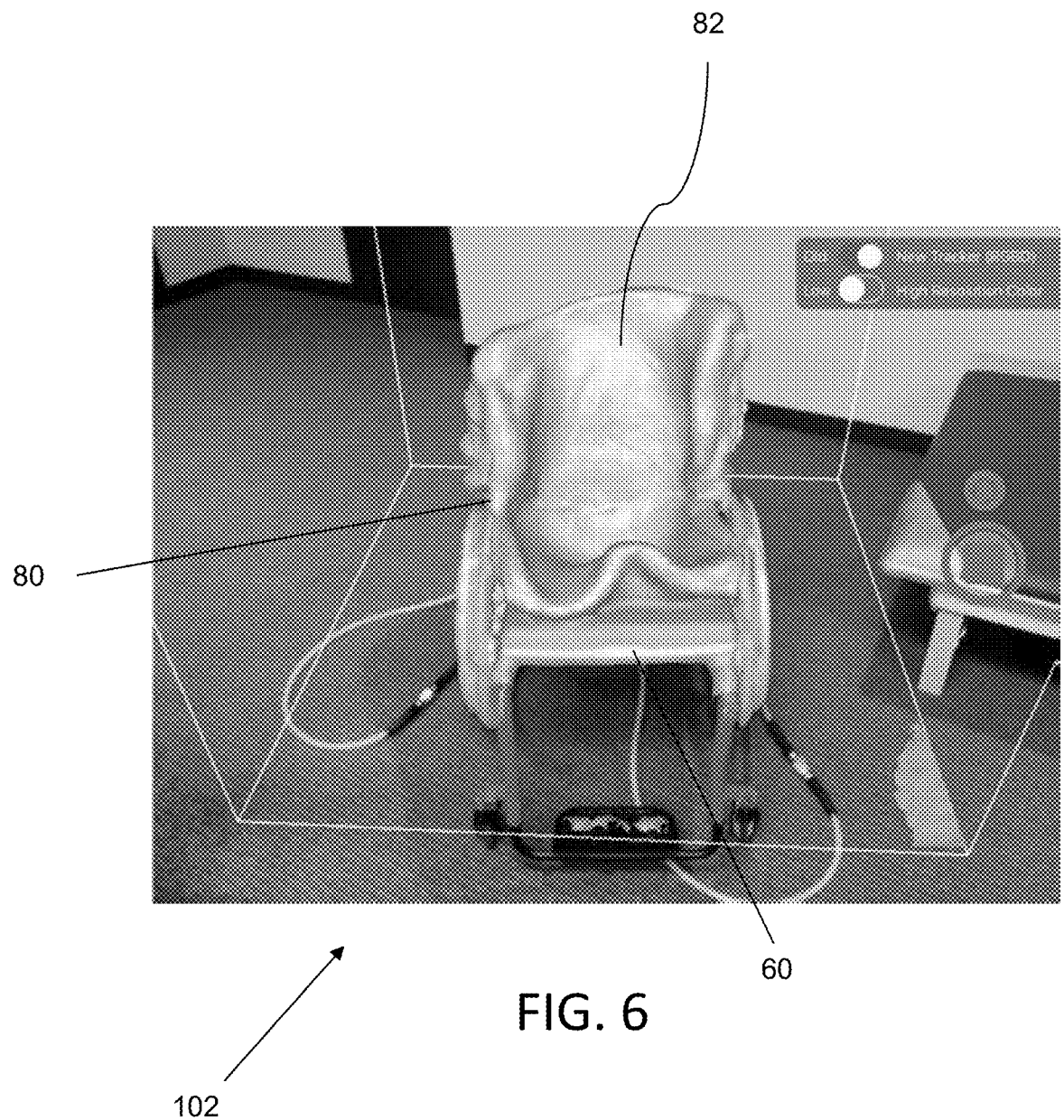
FIG. 6 is an example of a three-dimensional digital image captured by the electronic tablet.

FIG. 5 shows an operator holding an electronic tablet 100 including a scanner 101 and capturing a three-dimensional digital image 102 of the shape capture bags 80 and 82. One example of the three-dimensional scanner 101 is the Structure Sensor available from Occipital, Inc., although any other suitable three-dimensional scanner could be used An app entitled RideWorks has been downloaded onto the tablet 100. The app will allow the operator to control the scanner and capture the three-dimensional digital image. FIG. 6 shows the three-dimensional digital image 102 captured by the tablet 100. Note the white appearance of the shape capture bags 80 and 82 in the captured image 102. The white portion of the image 102 indicates that portion of the surface of one of the shape capture bags 80 or 82 has been fully captured. The operator can proceed to scan the surface from an appropriate distance and from various angles and positions until the entire surface appears white. Note also the appearance of the datum layer 60 in the captured image 102.

Figure 7:
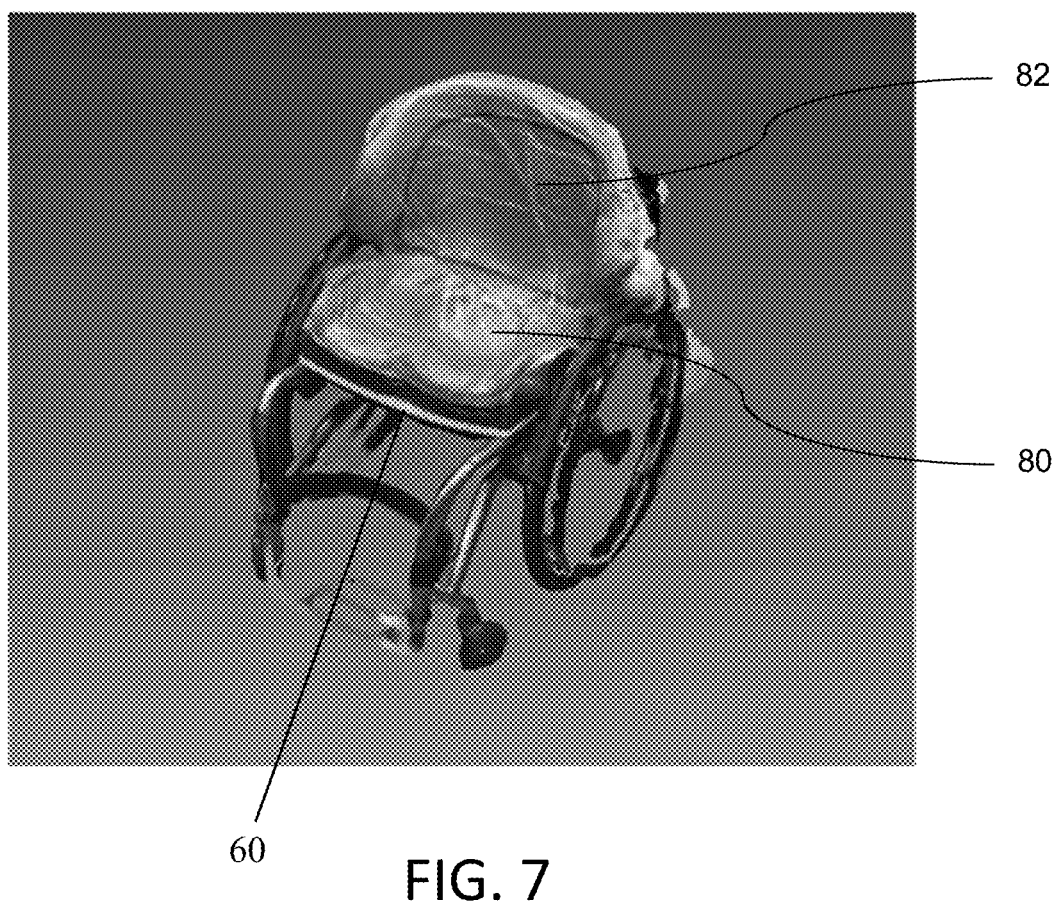
FIG. 7 is a three-dimensional digital image of a wheelchair with shape capture bags above a datum layer.
Figure 11:
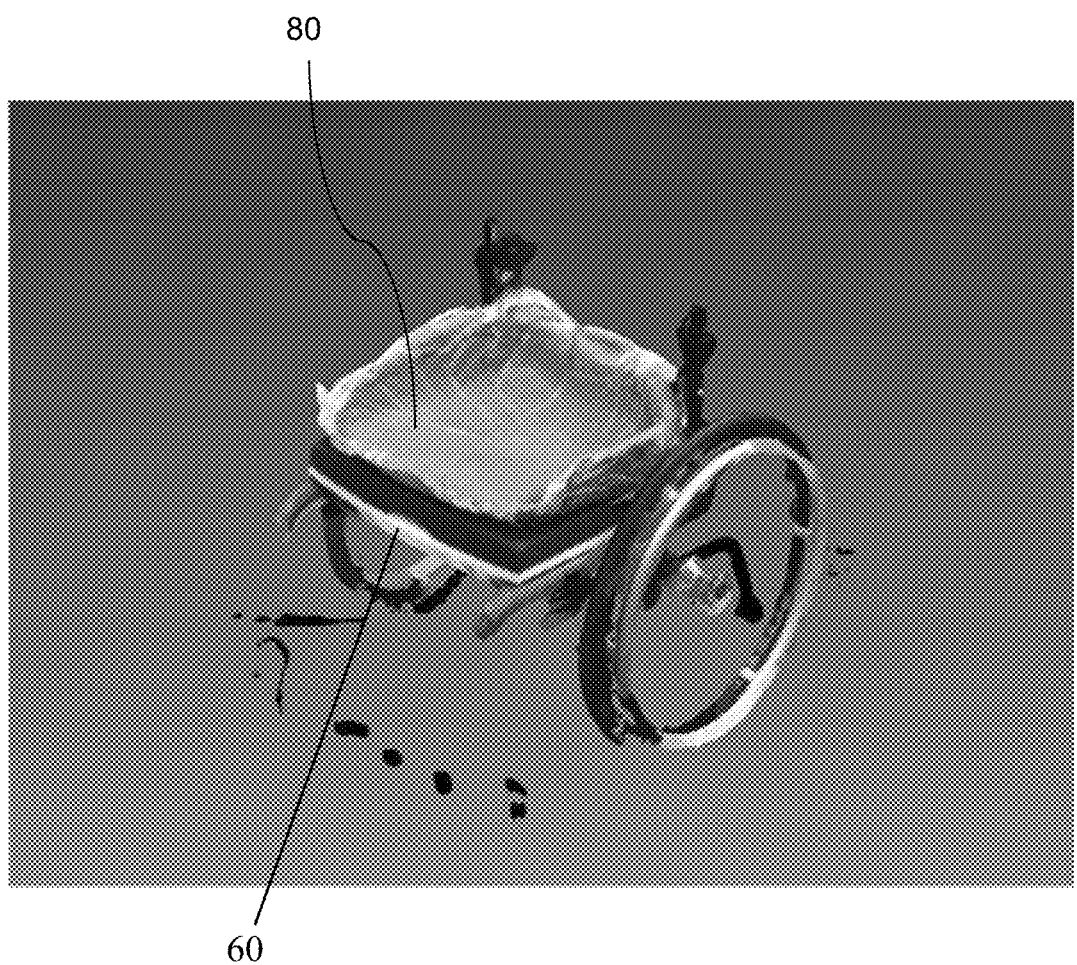
FIG. 11 is a three-dimensional digital image of portions of the wheelchair captured during the shape capture method disclosed herein.
Figure 12:
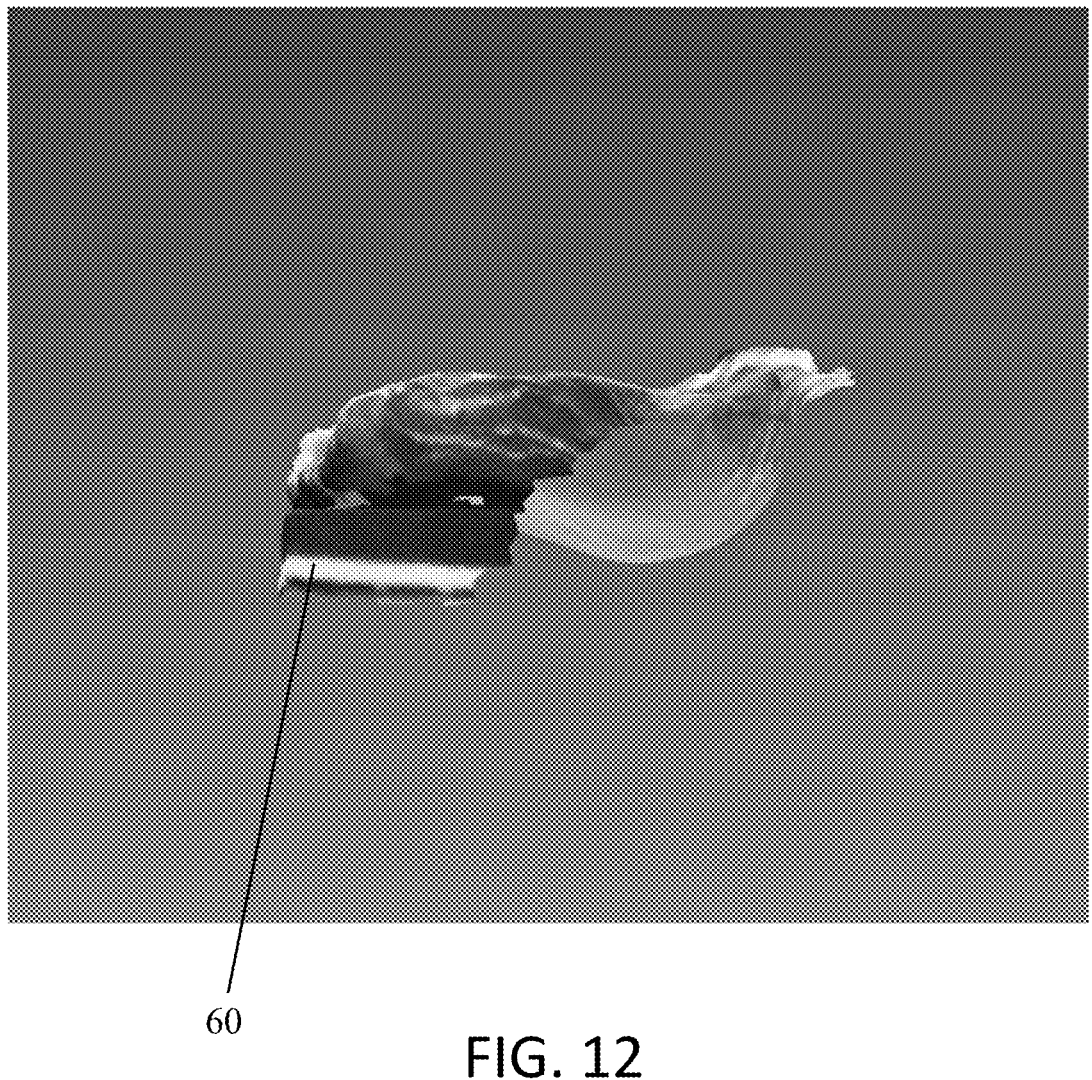
FIG. 12 is a side view of the seat capture bag and datum layer.
Figure 13:
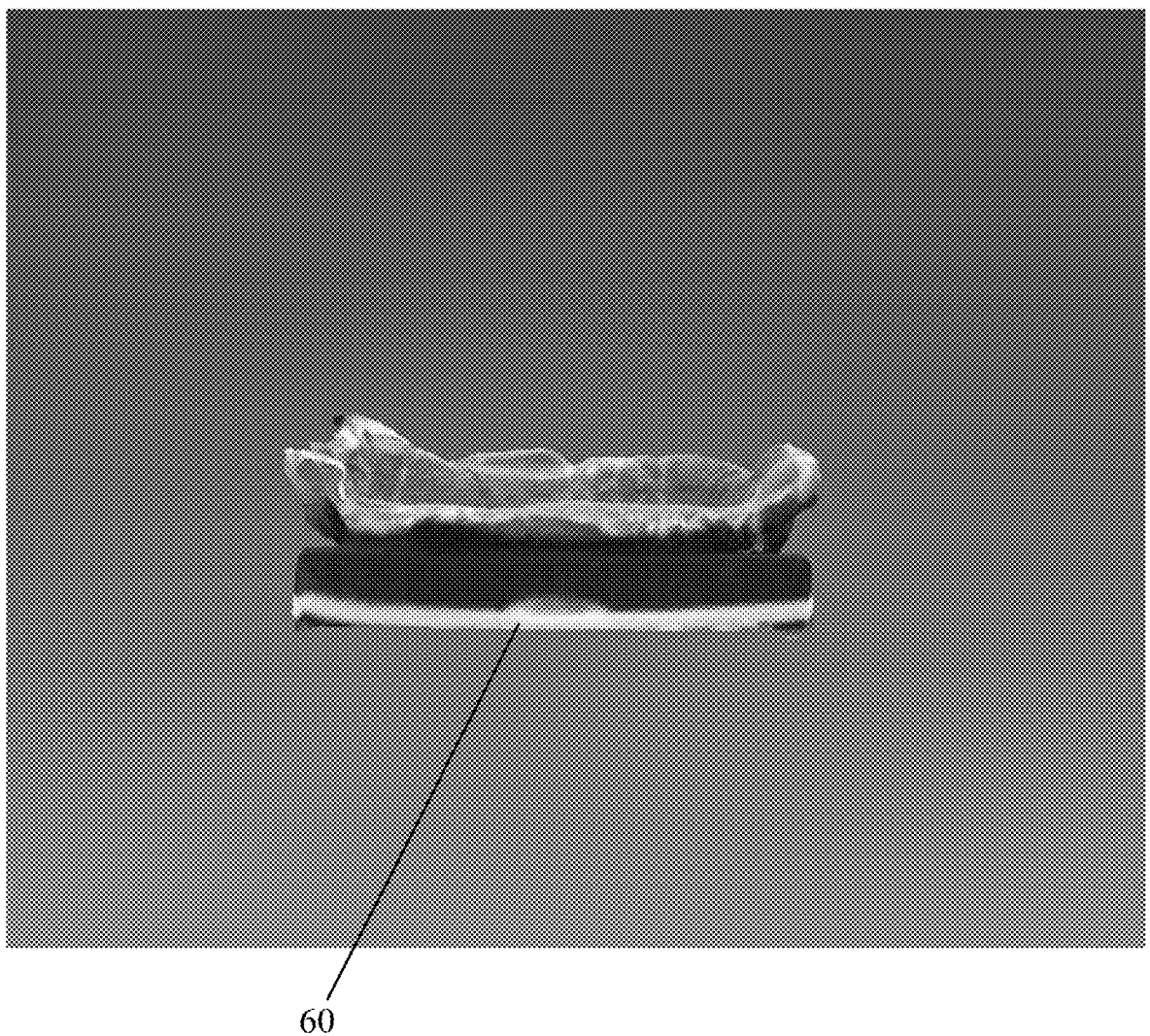
FIG. 13 is a front view of the seat capture bag and datum layer.

The captured image 102 can be imported onto a separate computer that is operating a modification software program such as Canfit, which is available from Vorum Research Corporation (for modification of the image 102), or the software could be used on the tablet 100 to modify the image 102. FIG. 7 shows the raw scanned image, and FIG. 11 shows portions thereof, including the surface of the shape capture bag 80, as seen from a side isometric view. FIG. 12 shows a screenshot of the left side of the shape capture bag 80 after unneeded portions of the scan have been removed such as the wheelchair wheels and frame. FIG. 13 shows a screenshot of the front side of the shape capture bag 80. In order to be able to reference the formed seat to the bottom surface of the seat and/or the mounting surface on the frame of the wheelchair 50, it is useful for at least a two-inch extent of the datum layer 60 be visible in the screenshots.

Figure 8:
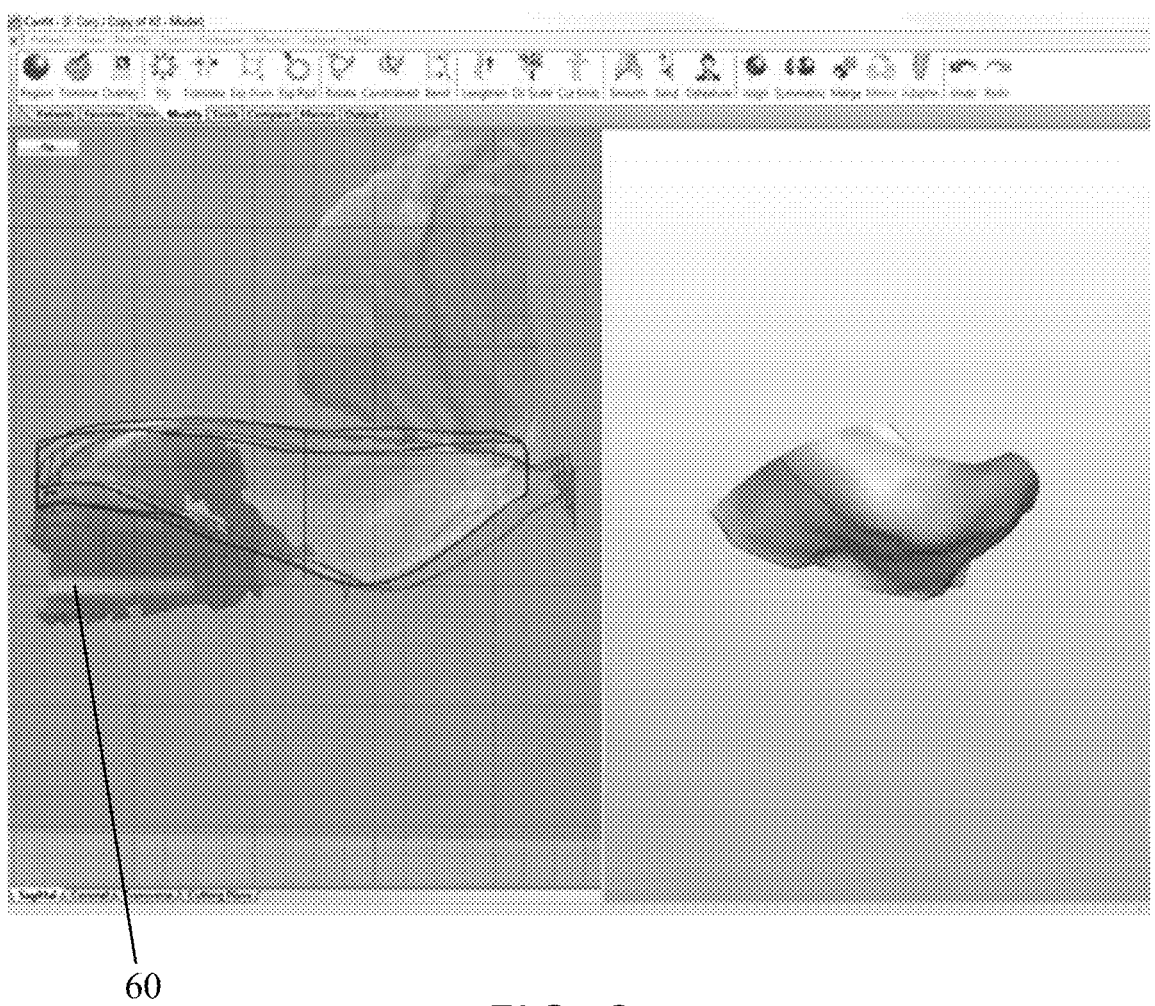
FIG. 8 is a side view of the three-dimensional shape imported into modification software for digital shape modification, and showing the shape being oriented and aligned to two-dimensional images of the datum surface and shape capture bags.
Figure 9:
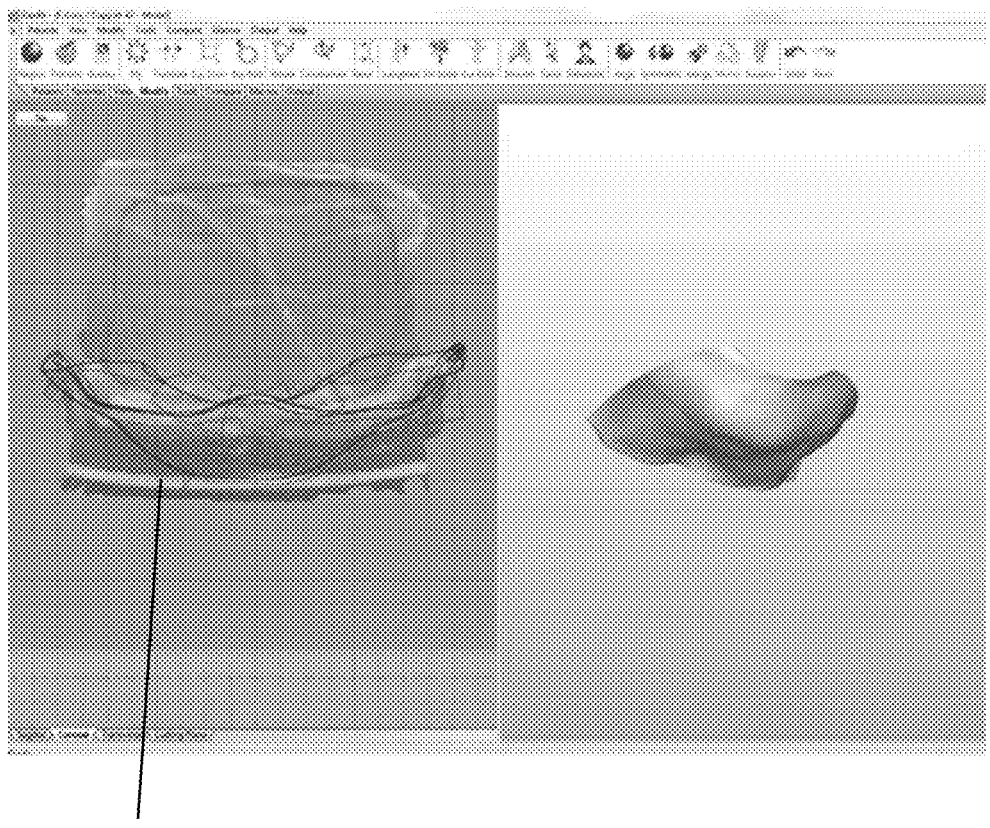
FIG. 9 is a front view of the three-dimensional shape being oriented and aligned to two-dimensional images of the datum surface and shape capture bags.
Figure 14:
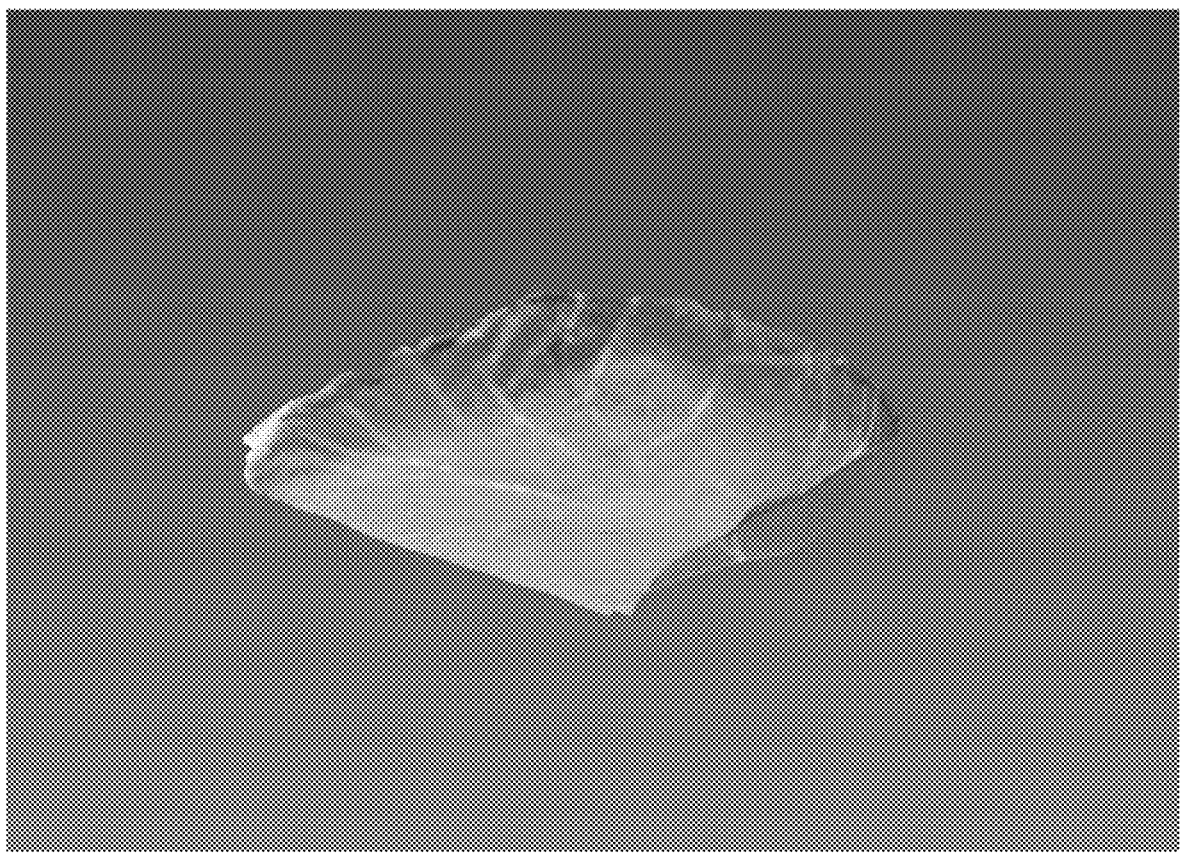
FIG. 14 is a contoured upper surface of the seat capture bag, after un-needed exterior surfaces have been removed from the three-dimensional digital shape.
Figure 15:
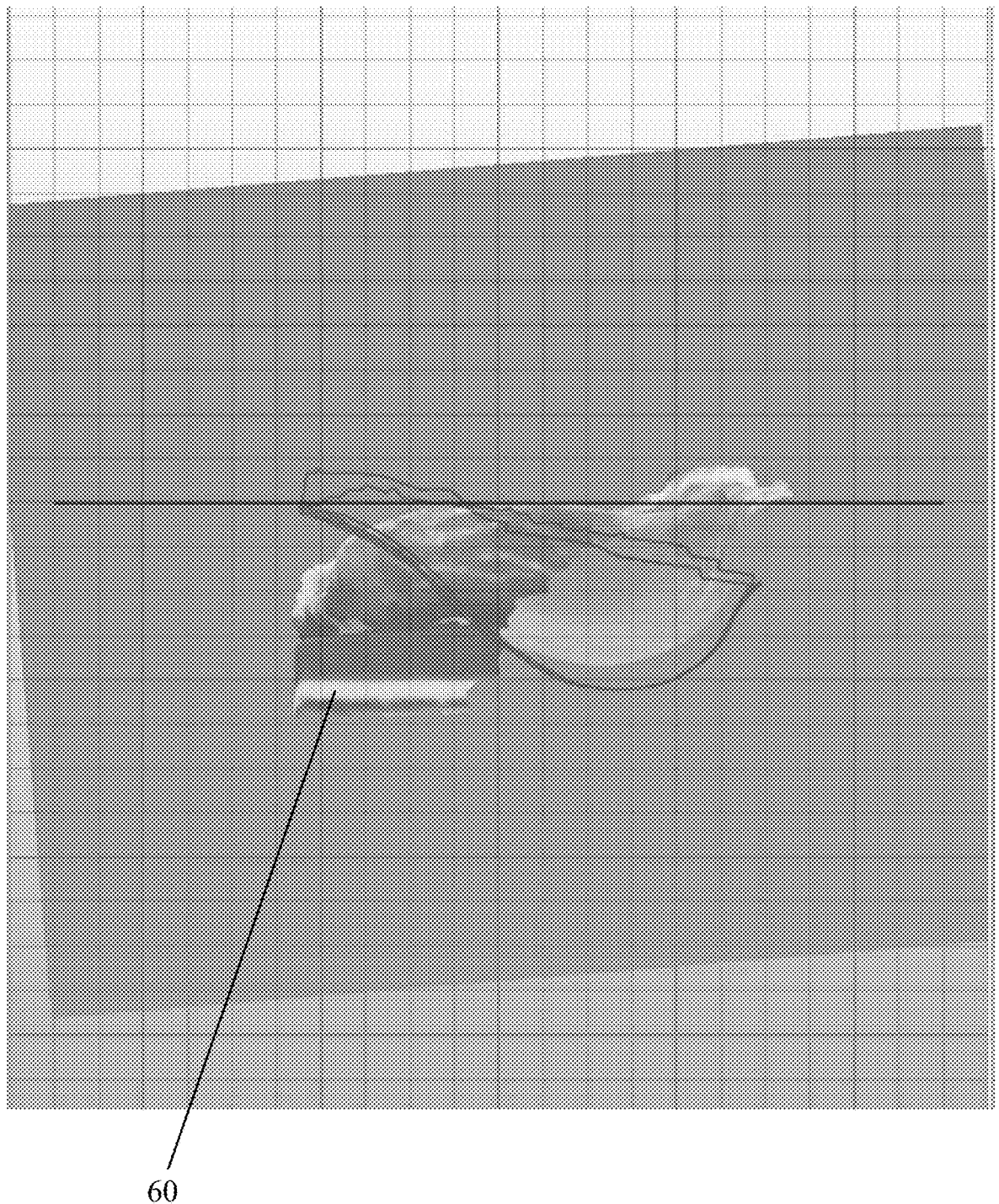
FIG. 15 is a side view of the seat capture bag and datum layer, showing an orientation and alignment to a two-dimensional image of the datum surface and shape capture bags step.
Figure 16:
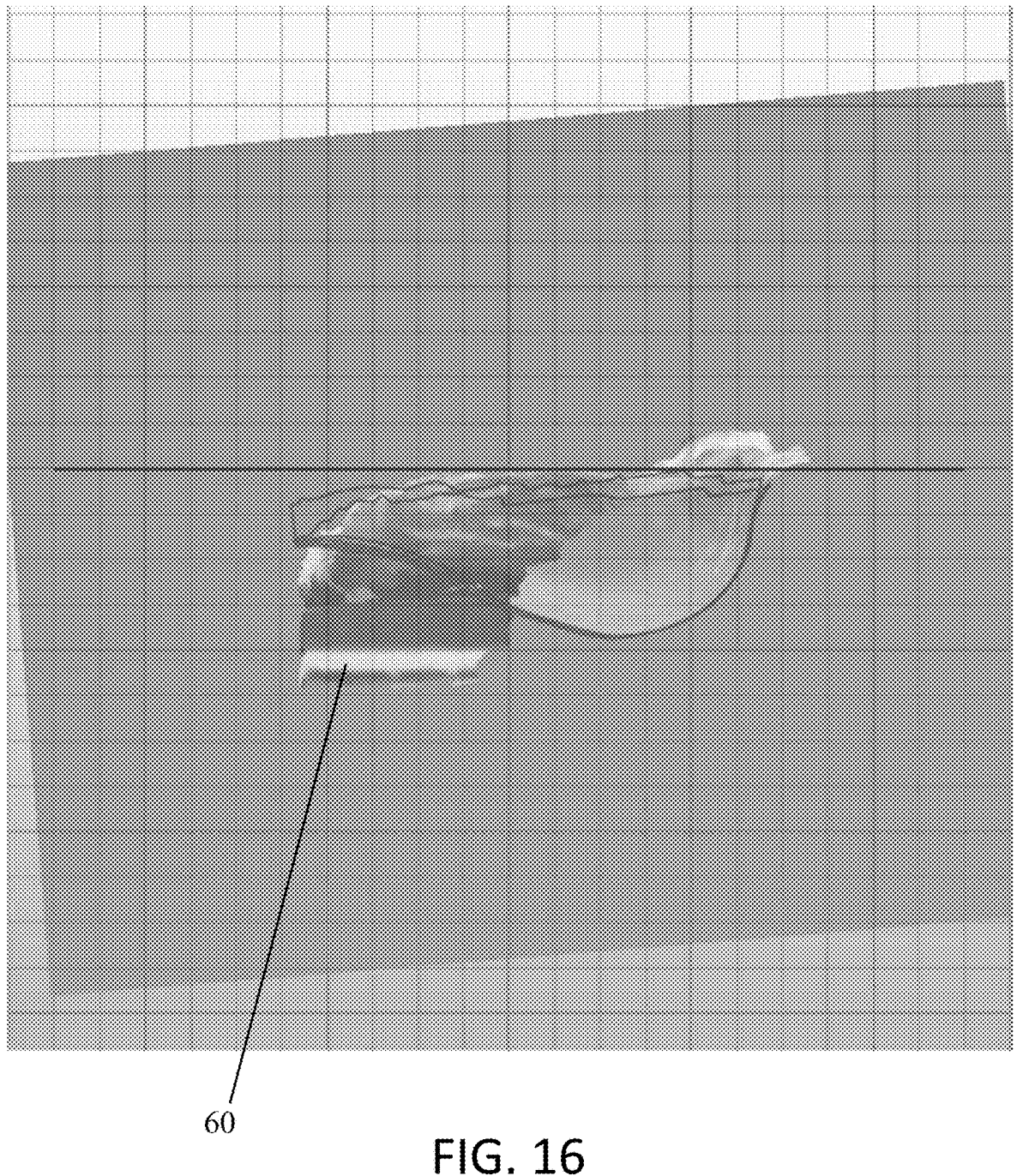
FIG. 16 is the side view, also showing the orientation and alignment step.
Figure 17:
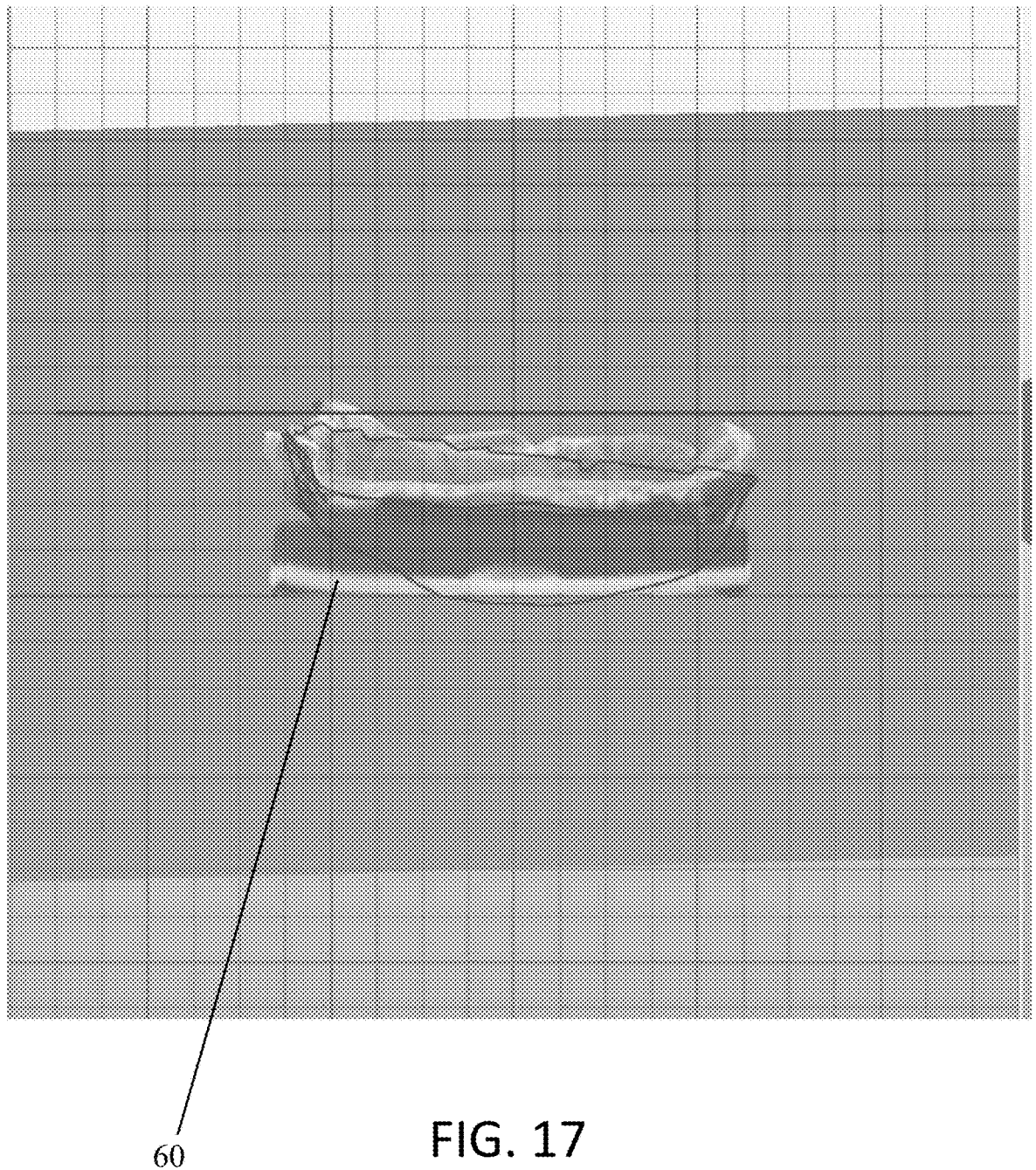
FIG. 17 is a front view of the seat capture bag and datum layer, showing an orientation and alignment to a two-dimensional image of the datum surface and shape capture bags step.
Figure 18:
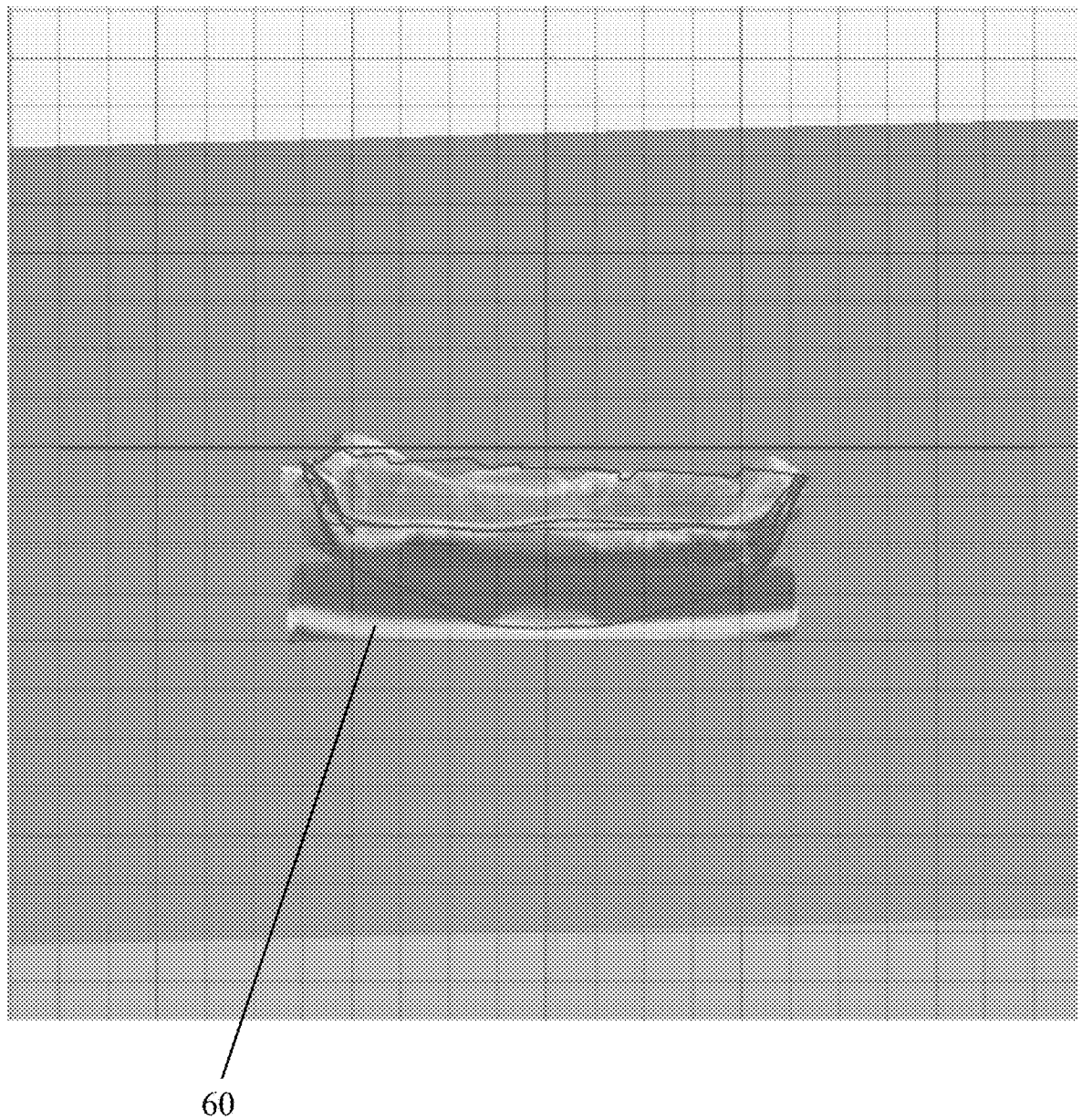
FIG. 18 is the front view, also showing the orientation and alignment step.

FIG. 14 shows the surface of the shape capture bag 80 after all other objects and surfaces have been trimmed away. FIGS. 8, 15, and 16 show the relevant portion of the image file (red lines) as imported into the modification software and then after the seat surface is reoriented until the datum layer 60 reaches a preferred angle with regard to the visible grid lines. In this case, that preferred angle is zero degrees, so that the datum layer 60 lies parallel to and along the grid lines. While FIGS. 8, 15, and 16 show the angular orienting of the seat surface in the side view, FIGS. 9, 17, and 18 show the angular orienting of the seat surface in the front view. As can be seen, the seat back angle is defined via the relationship of the datum points on the seat base to the seat back. At least FIGS. 8 and 9 show the seat back and the seat bottom/cushion surface being aligned in relationship together as we align the datum points to the grid lines within the software.

Figure 10A:
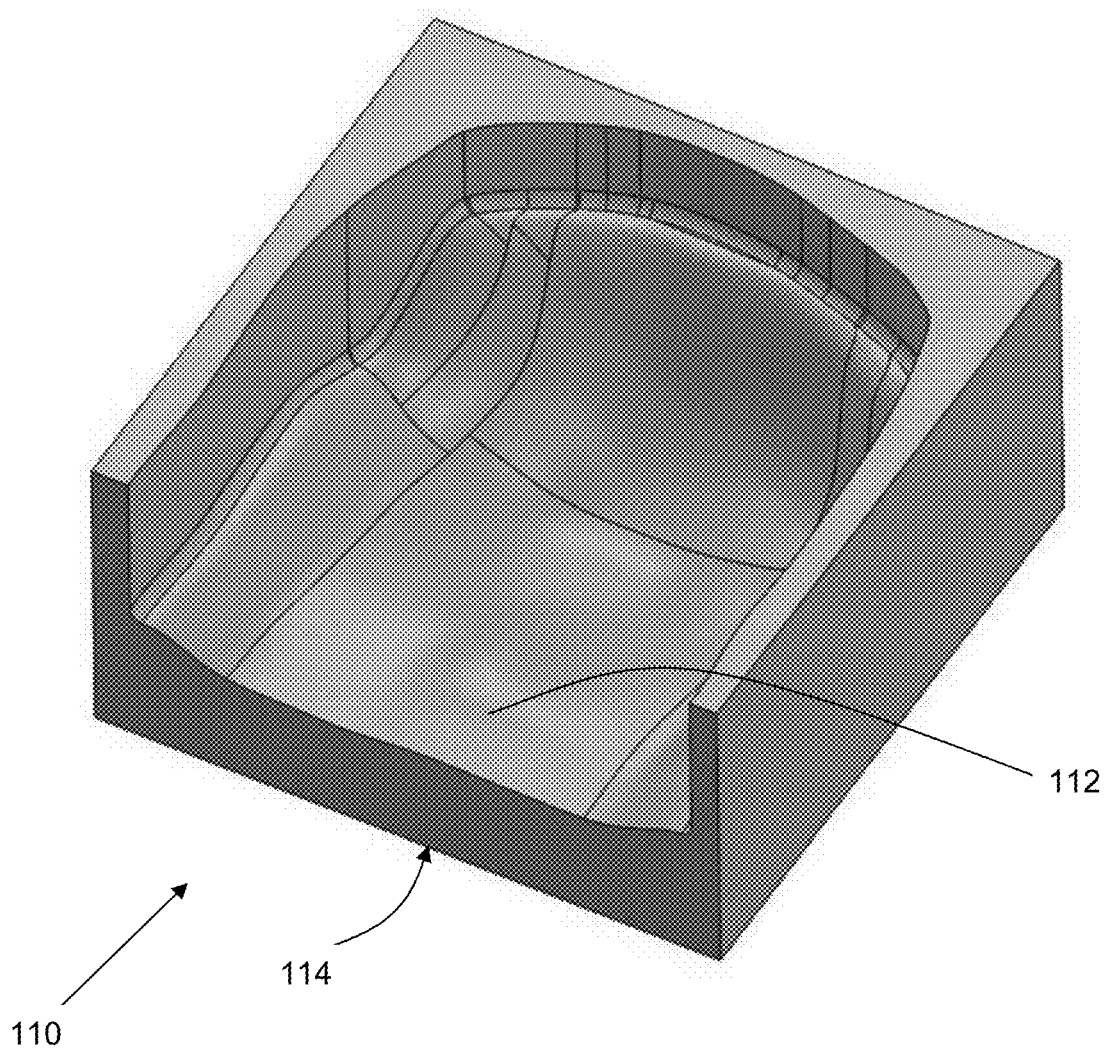
FIG. 10A is a seat that has been produced per the teachings disclosed herein.
Figure 19:
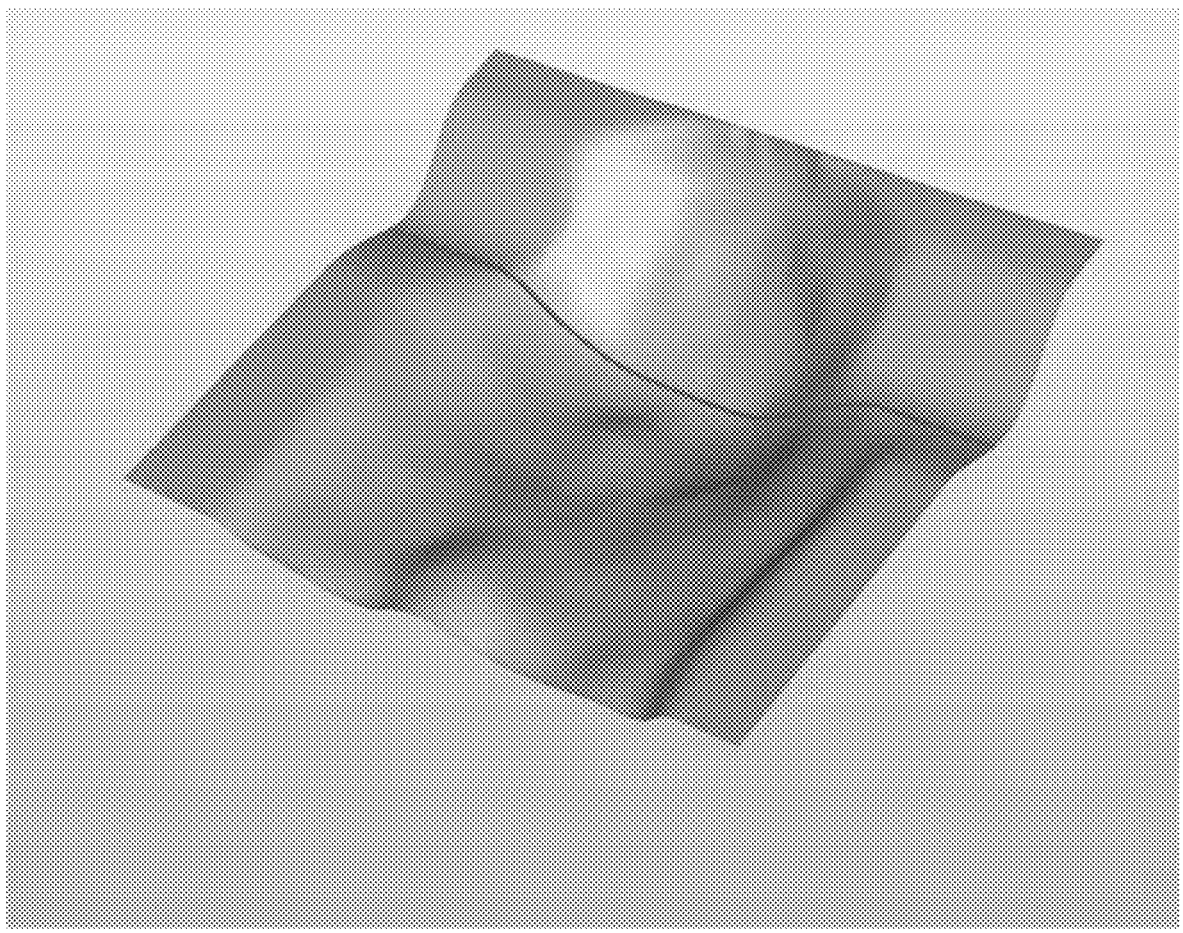
FIG. 19 is a view showing the effects of using computer software to smooth imperfections in the three-dimensional digital surface.
Figure 20:
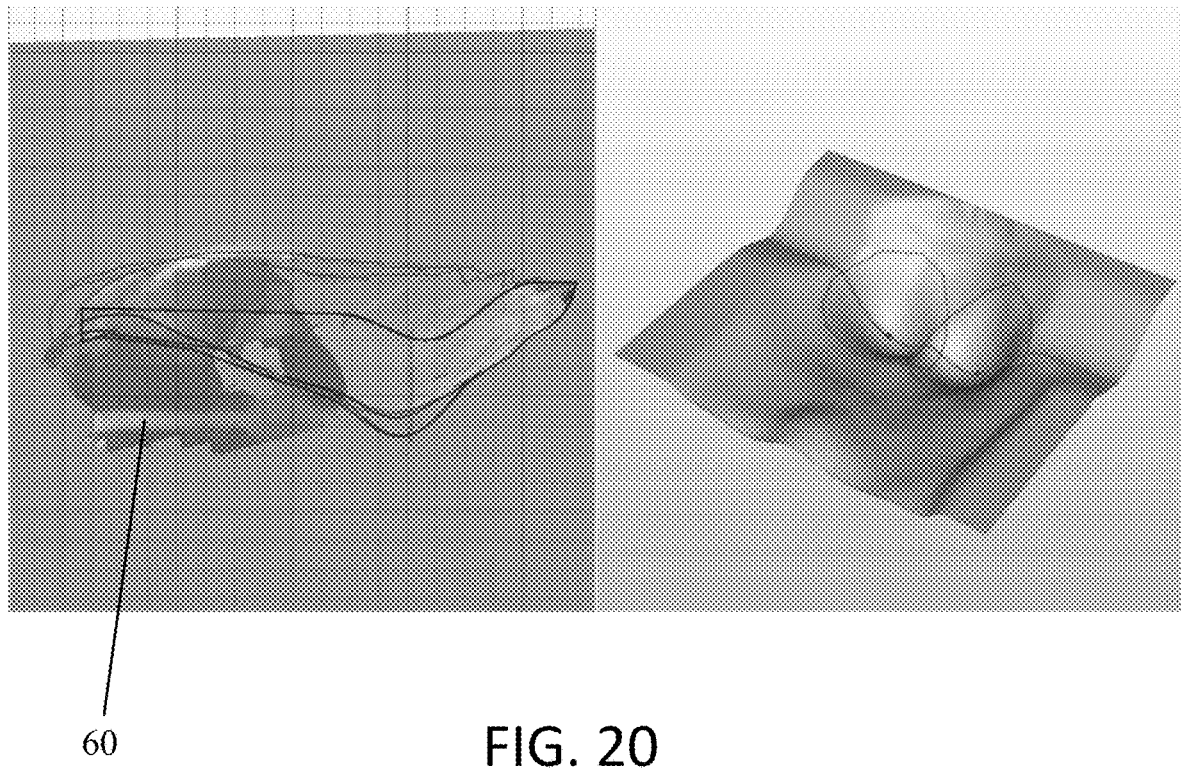
FIG. 20 is a view showing the effects of relieving high pressure areas of the three-dimensional digital surface that correlate to the bony prominences of a human's pelvic bones.

FIG. 19 shows the modified surface after the smoothing tools within the software have been used to clean up the shape. FIG. 20 shows the use of a tool to create relief areas or to increase contact in other areas as constrained by a region defined by the software operator. The adjusted or modified image is then converted to a digital file in a format required by the type of seat-forming machine being used. The machine then forms the seat and FIG. 10A shows the completed seat 110 or cushion, having a contoured upper surface 112 and a (in this case) planar bottom surface 114 that interfaces with the wheelchair 50 by resting on the support base 58. Note that the support base 58 may be planar and may be located in a horizontal plane, but most typically the support base 58 will be tilted relative to horizontal, as many wheelchairs are designed with a certain amount of "dump" angle that tilts the user back toward the back rest. By having the datum layer 60 on and aligned with the support base 58, and by forming the seat 110 with a controlled angular orientation relative to the bottom 114 of the seat, the bottom of the produced seat can be placed on top of the support base 58 and the upper surface of the produced seat will be located at the same angular orientation relative to the remainder of the wheelchair as the top surface of the seat capture bag 80 was.

Figure 10B:
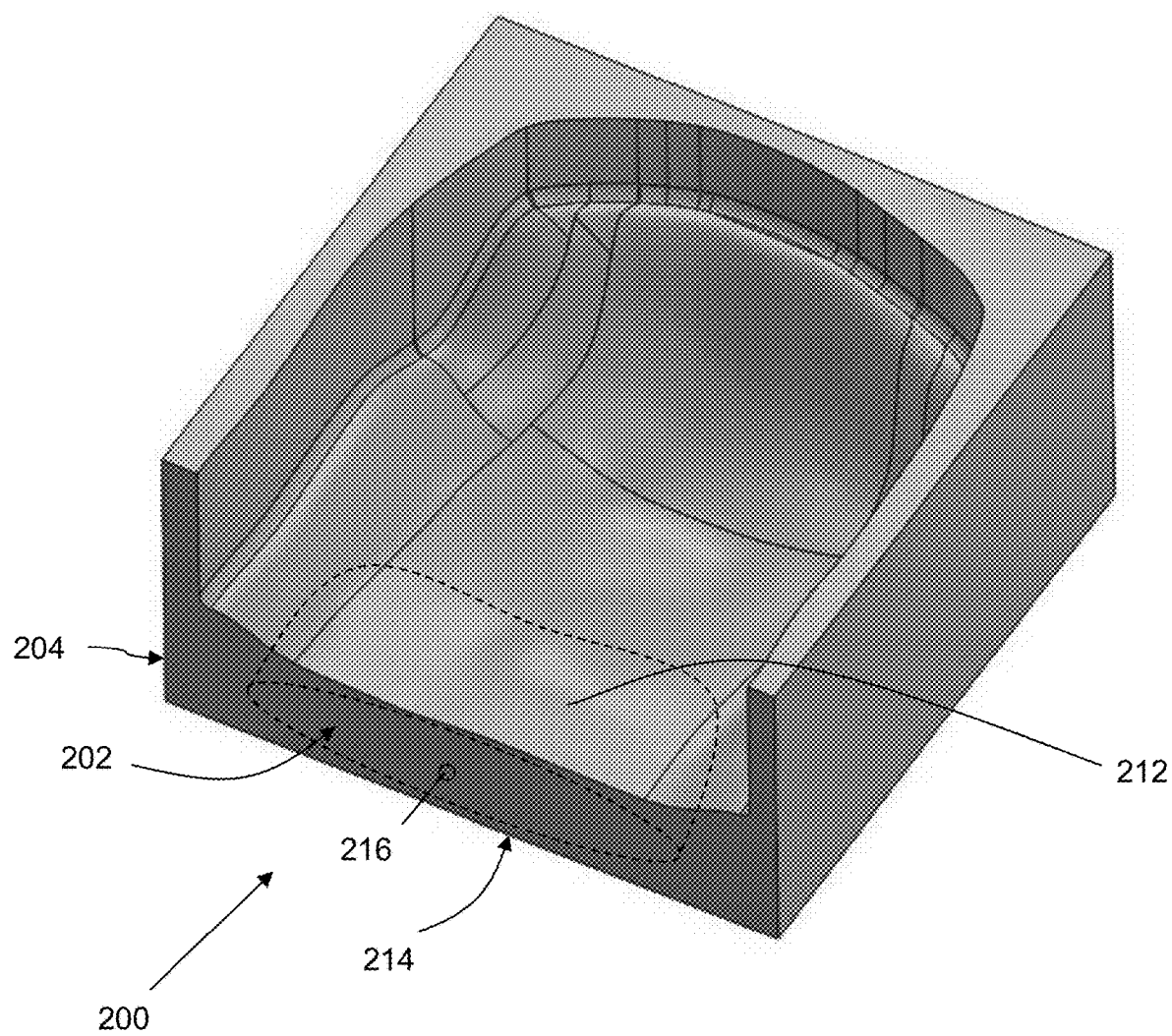
FIG. 10B is a different seat that has been produced per the teachings disclosed herein.

Also, a contoured seat 200 could be constructed of multiple differently-shaped components. This could include fixed-shape components such as separate layers, wedges, and/or lifts. It could alternatively or also contain components with an adjustable shape, such as inflatable air pockets, adjustable bladders of fluid (which may include a gas (such as air) or liquid) or the like, or movable internal components which adjust the shape of the upper surface. An example of this is shown in FIG. 10B which shows a fluid bladder 202 located in the bottom portion 204 of the seat 200, between the contoured upper surface 212 and the planar bottom surface 214 of the seat 200. The amount of fluid in the fluid bladder may be adjustable via a selectably sealable valve 216.

Figure 21:
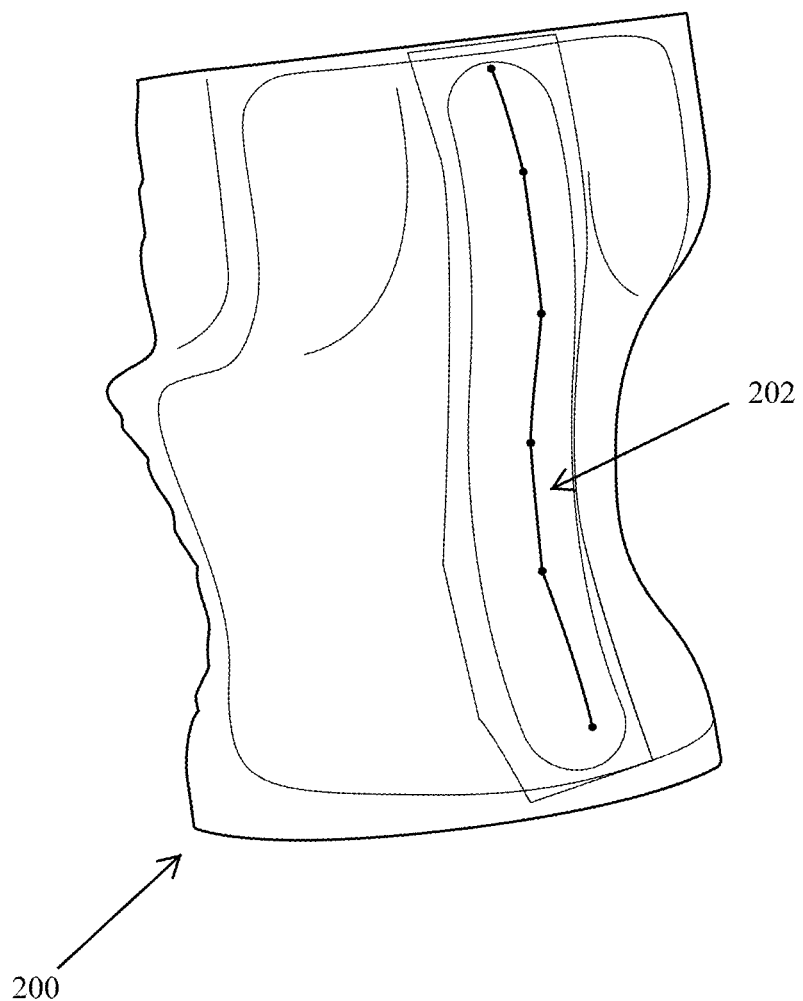
FIG. 21 is an illustration of off-loading of portions of a user's back in a wheelchair seat back.

FIG. 21 is an illustration of off-loading of portions of a user's back in a wheelchair seat back 200. Just as it may be desirable to change the contour of the upper surface of the seat layer, it may be desirable to change the shape of the seat back to off-load areas 202 where there are bony prominences on the user's back.

Figure 22:
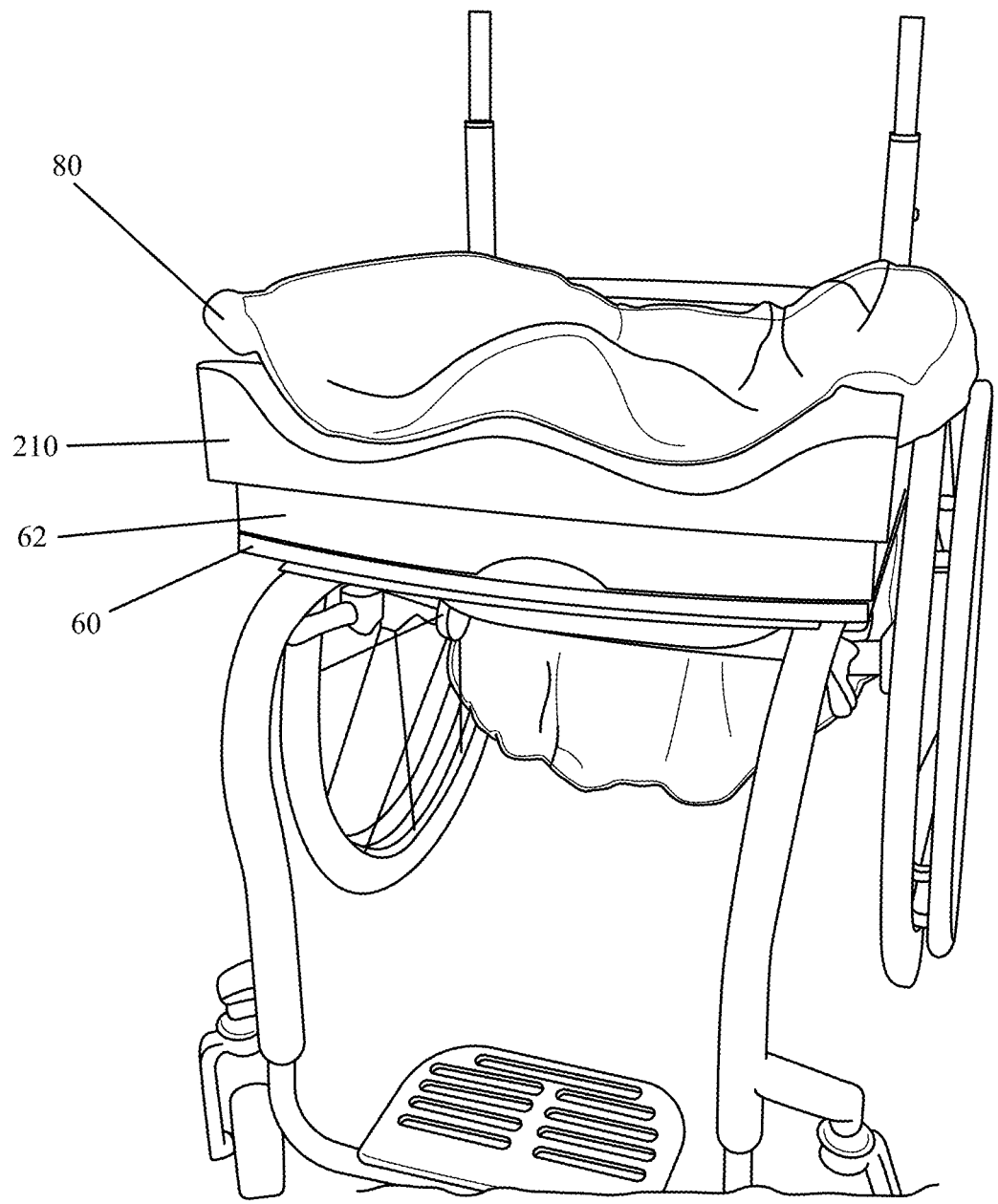
FIG. 22 shows a contoured object under a shape capture bag on a seat base.
Figure 23:
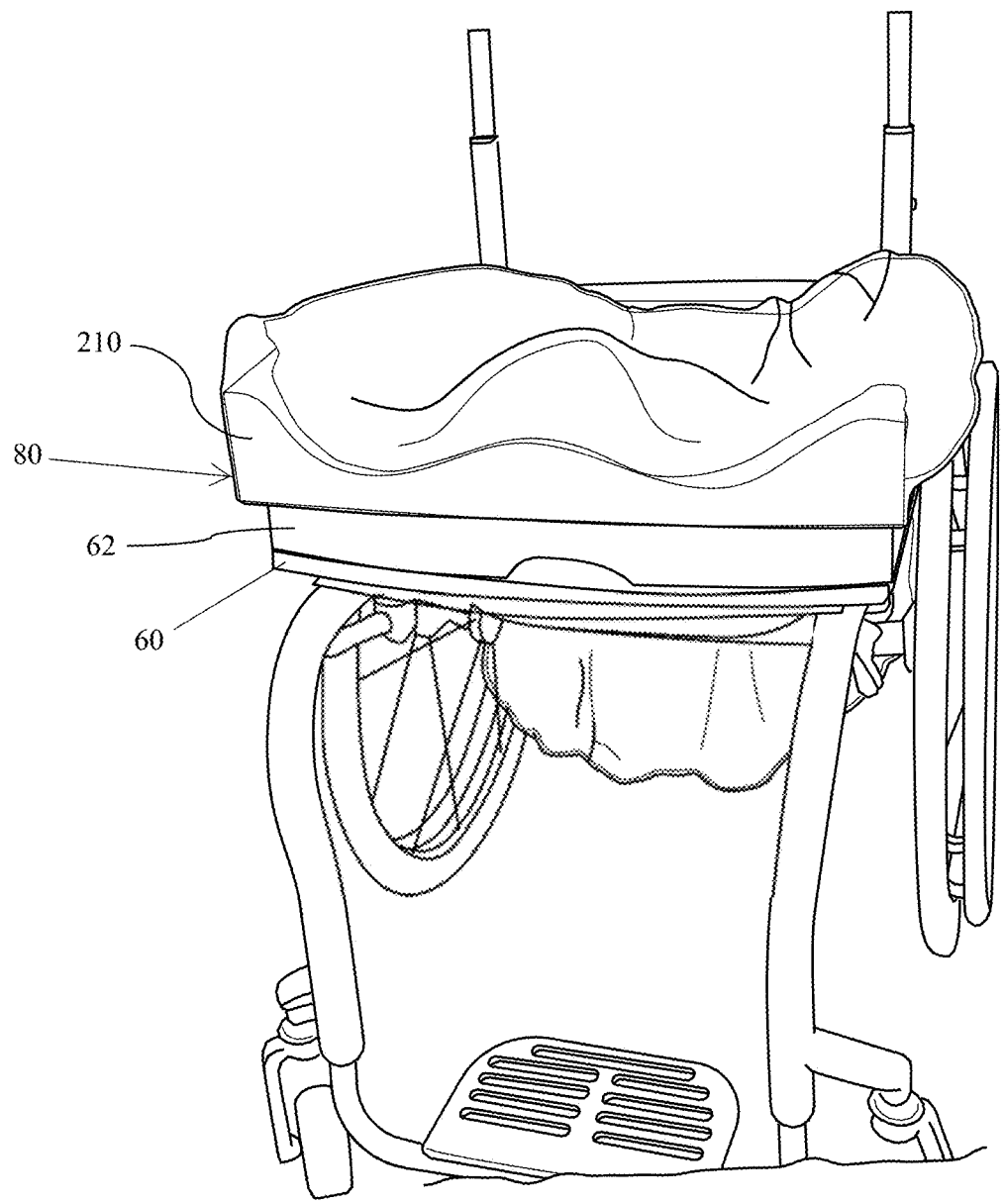
FIG. 23 shows a contoured object inside a shape capture bag on a seat base.

FIG. 22 shows a contoured object 210 under the shape capture bag 80 on the seat base 62. FIG. 23 shows the contoured object 210 inside the shape capture bag 80 on the seat base 62.

Figure 24:
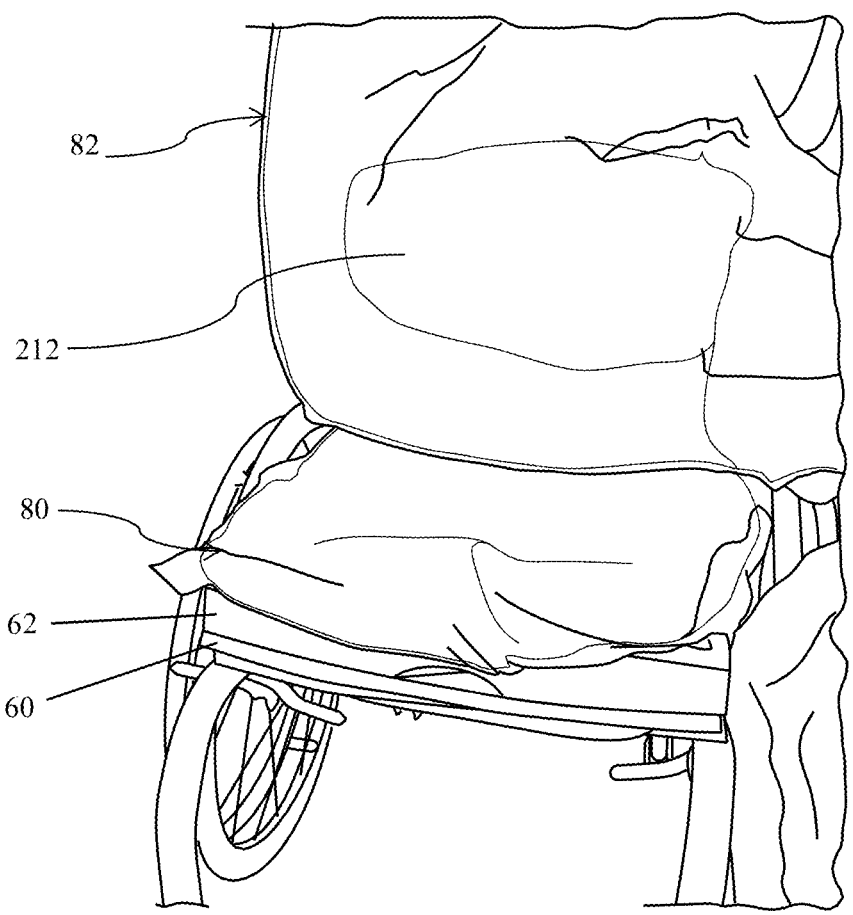
FIG. 24 shows a contoured object inside a shape capture bag in a position on a wheelchair to capture a back shape.

FIG. 24 shows a contoured object 212 inside the shape capture bag 82 in a position on a wheelchair to capture a back shape.

Figure 25:
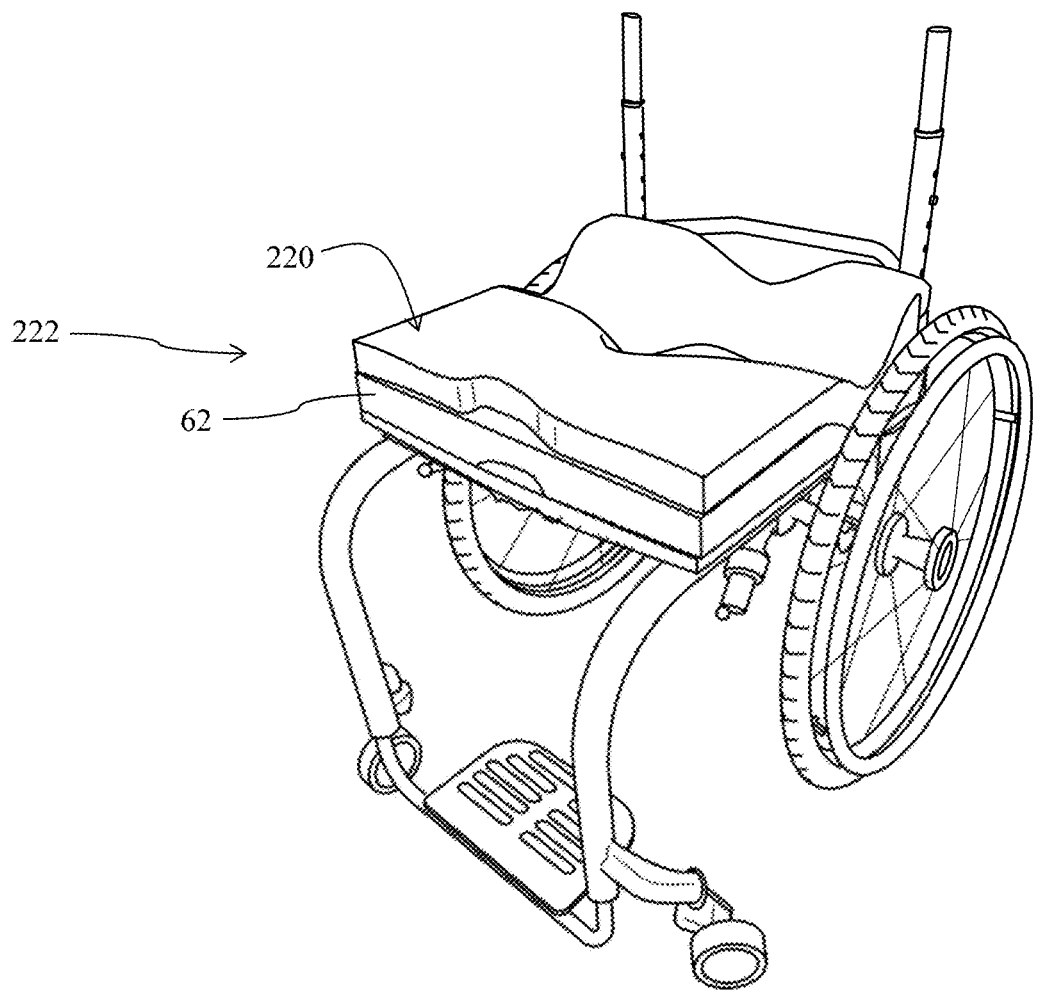
FIG. 25 shows a seat layer produced by a seat-forming machine, the seat layer placed on top of a seat base, to together constitute a seat.

FIG. 25 shows a seat layer 220 produced by a seat-forming machine, the seat layer 220 placed on top of the seat base 62, to together constitute a seat 222.

Figure 26:
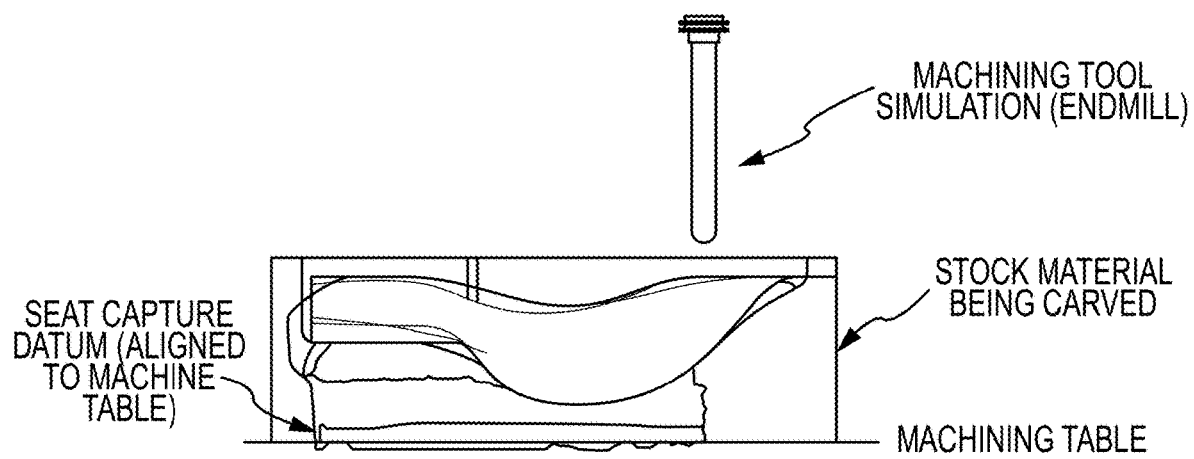
FIG. 26 shows the process of forming the seat layer on a milling machine, using the datum layer to orient the seat layer in space to the machine.

FIG. 26 shows the process of forming the seat layer on a milling machine, using the datum layer to orient the seat layer in space to the machine.

Figure 27:
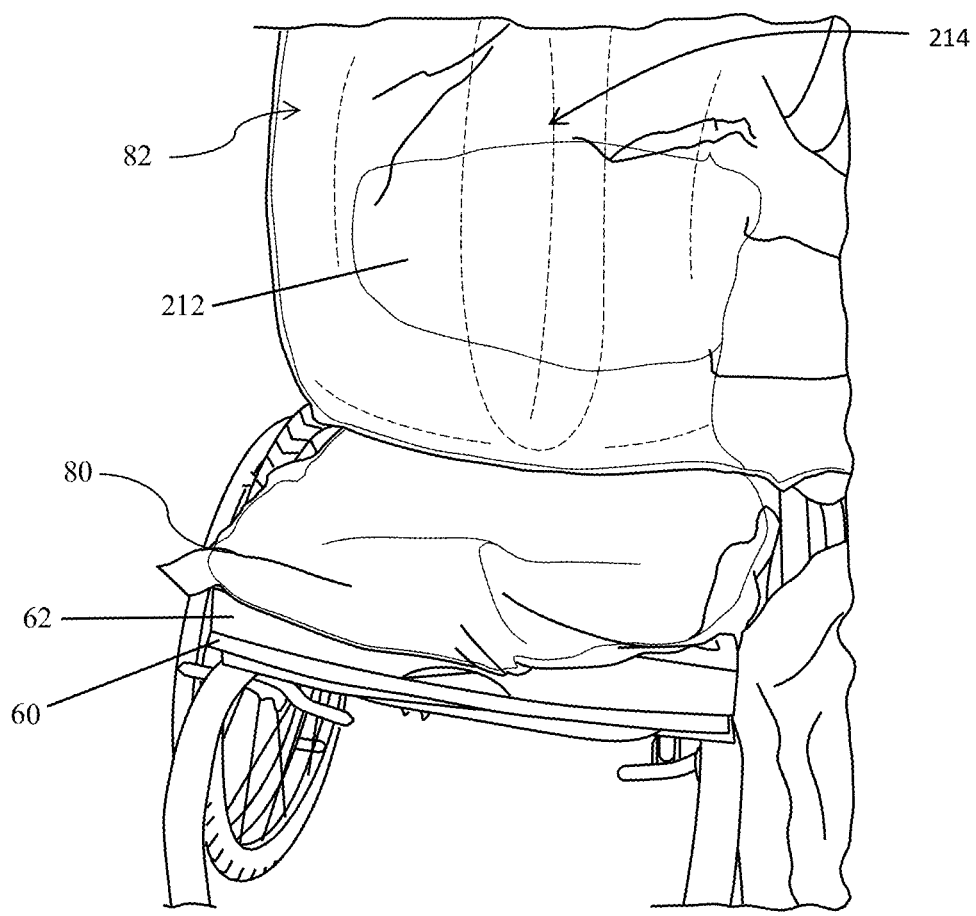
FIG. 27 shows at least a portion of a contoured seat back base positioned inside of a pellet-filed bag.

FIG. 27 shows at least a portion of a contoured seat back base 212 positioned inside of a pellet-filed bag 214 in the shape capture bag 82.

It should be understood that, while much of the description herein relates to creating a seat or upper seat layer, the techniques herein could also be employed to create a custom contoured back for a wheelchair. Further, the three-dimensional image captured can be used to accurately position the back relative to the seat and the back relative to the wheelchair.

While a particular type of shape capture bag has been described throughout, it should be understood that any other device could also be used with the techniques herein, so long as the device can be controlled to be in a "viscous' state when the user is sitting thereon and then subsequently in a firm, fixed, or solid state for image capture.

The datum points have been described to be associated with a separate datum layer, but they could be points (in the form of lines, fiducial marks, datum marks, or other) located in a plane of the seat shape capture base.

While the embodiments of the invention have been illustrated and described in detail in the drawings and foregoing description, such illustration and description are to be considered as examples and not restrictive in character. For example, certain embodiments described hereinabove may be combinable with other described embodiments and/or arranged in other ways (e.g., process elements may be performed in other sequences). Accordingly, it should be understood that only example embodiments and variants thereof have been shown and described.

We claim:

1. A method for creating a wheelchair seat, comprising:
   providing a wheelchair;
   providing one or more components that together define an upper surface that is generally in the shape of a contoured seat for a human subject and a lower surface that has a fixed angular orientation relative to the wheelchair, wherein the upper surface comprises a non-planar surface;
   placing a shape capturing device on the upper surface of the one or more components;
   seating a human subject on the shape capturing device;
   capturing the shape of a portion of the human subject with the shape capturing device while the human subject is seated on the shape capturing device;
   once the human subject is removed from the shape capturing device, using a three-dimensional scanner to create a captured three-dimensional digital image, the three-dimensional digital image comprising surface portions of the shape capturing device that were impacted by the human subject sitting on the shape capturing device;

removing the shape capturing device from the one or more components after acquiring the three-dimensional digital image;

providing a seat-forming machine;

providing to the seat-forming machine a digital file that is based on the captured three-dimensional digital image; and forming material associated with the seat-forming machine to create a seat layer for the human subject based on the digital file, wherein a custom wheelchair seat comprises the seat layer.

2. A method as defined in claim 1, wherein the one or more components include a set of datum points thereon, wherein the captured three-dimensional image includes at least three of the set of datum points, wherein the at least three datum points define a plane that is parallel to the lower surface of the one or more components, and wherein the digital file includes data therein to communicate to the seat-forming machine an angular offset between the plane and an upper surface of the seat layer to be formed.

3. A method as defined in claim 2, wherein the one or more components include a single layer of material that is in the shape of a contoured seat for a human subject.

4. A method as defined in claim 3, wherein the at least three of the set of datum points lie on the single layer of material.

5. A method as defined in claim 3, wherein the at least three of the set of datum points lie on a second layer of material that is located adjacent to a bottom surface of the single layer of material.

6. A method as defined in claim 5, wherein the second layer includes at least one visible indication thereon that indicates the size of the contoured seat.

7. A method as defined in claim 6, wherein the visible indication includes a color code.

8. A method as defined in claim 3, wherein the single layer includes at least one visible indication thereon that indicates the size of the contoured seat.

9. A method as defined in claim 8, wherein the visible indication includes a color code.

10. A method as defined in claim 3, wherein the single layer of material in the shape of the contoured seat is a layer of foam material, the foam material of the single layer of material in the shape of the contoured seat being of a first hardness, and wherein the seat layer is a layer of foam material that is of a second hardness that is softer than the first hardness of the single layer of material in the shape of the contoured seat.

11. A method as defined in claim 3, wherein the custom wheelchair seat comprises the seat layer combined with the contoured seat to rest on top thereof.

12. A method as defined in claim 3, wherein the custom wheelchair seat comprises the seat layer combined with a separate instance of a contoured seat to rest on top thereof.

13. A method as defined in claim 3, wherein the seat layer is formed of a unitary piece of material with a lower surface having the same fixed angular orientation relative to the wheelchair.

14. A method as defined in claim 1, wherein the captured three-dimensional digital image is adjusted to off-load certain areas of the human subject, and the adjustments to the three-dimensional digital image are represented in an adjusted three-dimensional digital image which is then converted to the digital file for the seat-forming machine.

15. A method as defined in claim 1, wherein the shape capturing device includes a pellet-filled bag and a port in the device for fluid communication between an interior of the device and an exterior of the device and the device also includes a pump for selectively evacuating air from the device.

16. A method as defined in claim 15, wherein the device includes an outer, sealable bag having the port therein, and wherein the pellet-filled bag is located within the outer bag.

17. A method as defined in claim 1, wherein:

the shape capturing device captures a shape of at least portions of the back of the human subject, and wherein the captured three-dimensional digital image includes surface portions of the captured back shape;

the digital file is based at least in part on the surface portions of the captured back shape; and the forming material step includes creating a wheelchair seat back for the human subject based on the digital file.

18. A method as defined in claim 1, wherein the seat layer is combined with a contoured seat that includes a plurality of components, wherein the seat layer is located on top of the contoured seat.

19. A method as defined in claim 1, wherein the three-dimensional digital image further comprises the location of the lower surface, and wherein an upper surface of the seat layer and a lower surface of the custom wheelchair seat correspond with an upper surface of the shape capturing device after the capturing the shape of a portion of the human subject and the location of the lower surface of the one or more components, respectively.

20. A method of making a custom seat, comprising the steps of:

disposing a seat shape capture base on a first surface, wherein the seat shape capture base comprises an upper surface that is generally in the shape of a contoured seat for a human subject, wherein the upper surface of the seat shape capture base comprises a contoured portion that is non-planar;

placing a shape capturing device onto the upper surface of the seat shape capture base, wherein the seat shape capture base is separate from the shape capturing device;

seating a human subject on the shape capturing device after having been placed on the seat shape capture base;

capturing the shape of a portion of the human subject with the shape capturing device after having been placed on the seat shape capture base and while the human subject is seated on the shape capturing device;

removing the human subject from the shape capturing device;

capturing a three-dimensional digital image of surface portions of the shape capturing device that were impacted by the human subject sitting on the shape capturing device and after the human subject has been removed from the shape capturing device;

removing the shape capturing device from the seat shape capture base after acquiring the three-dimensional digital image;

providing a digital file to a seat-forming machine, wherein the digital file is based on the captured three-dimensional digital image; and operating the seat-forming machine to create a seat layer for the human subject based on the digital file, wherein a custom wheelchair seat comprises the seat layer.

21. The method of claim 20, wherein the seat shape capture base comprises a first hardness and the seat layer comprises a second hardness that is less than the first hardness.

22. The method of claim 20, wherein the custom wheelchair seat further comprises the seat shape capture base and with the seat layer being positioned on top of the seat shape capture base.

23. The method of claim 20, wherein the first surface is a support base of a wheelchair.

24. The method of claim 20, wherein the seat shape capture base comprises an upper section and a separate datum layer, wherein the upper section is disposed on the datum layer, and wherein the datum layer is disposed on the first surface.

25. The method of claim 20, wherein the seat shape capture base comprises a lower surface, wherein the capturing a three-dimensional digital image comprises capturing a location of the lower surface of the seat shape capture base relative to an upper surface of the shape capturing device.

26. The method of claim 20, wherein an upper surface of the seat layer and a lower surface of the wheelchair seat correspond with an upper surface of the shape capturing device after the capturing the shape of a portion of the human subject and a location of a lower surface of the seat shape capture base, respectively.

27. The method of claim 20, further comprising biasing the shape capturing device using the upper surface of the seat shape capture base.

28. The method of claim 20, wherein the upper surface of the seat shape capture base comprises a forward region and a central region, where the central region is at a significantly lower height than the forward region.

29. The method of claim 20, wherein the upper surface of the seat shape capture base comprises a cavity.

30. A method for customizing a seat, comprising the steps of:
   disposing a seat shape capture base on a first surface, wherein the seat shape capture base comprises an upper surface that is generally in the shape of a contoured seat for a human subject, wherein the upper surface of the seat shape capture base comprises a contoured portion that is non-planar;
   placing a shape capturing device onto the upper surface of the seat shape capture base, wherein the seat shape capture base is separate from the shape capturing device;
   seating a human subject on the shape capturing device after having been placed on the seat shape capture base;
   capturing the shape of a portion of the human subject with the shape capturing device after having been placed on the seat shape capture base and while the human subject is seated on the shape capturing device;
   removing the human subject from the shape capturing device; and
   capturing a three-dimensional digital image of surface portions of the shape capturing device that were impacted by the human subject sitting on the shape capturing device and after the human subject has been removed from the shape capturing device.

* * * * *